US012285808B2

(12) United States Patent
Prakash et al.

(10) Patent No.: US 12,285,808 B2
(45) Date of Patent: Apr. 29, 2025

(54) COUPLING SYSTEMS AND METHODS OF USE THEREOF

(71) Applicant: THE BOEING COMPANY, Chicago, IL (US)

(72) Inventors: Om Prakash, Bangalore (IN); Sandeep Tripathi, Kanpur (IN); Megha Sahu, Bangalore (IN); Kamaraj Kandhasamy, Bangalore (IN); Carolyn L. Kupper, Summerville, SC (US)

(73) Assignee: The Boeing Company, Chicago, IL (US)

( * ) Notice: Subject to any disclaimer, the term of this patent is extended or adjusted under 35 U.S.C. 154(b) by 777 days.

(21) Appl. No.: 17/378,292

(22) Filed: Jul. 16, 2021

(65) Prior Publication Data

US 2022/0056930 A1    Feb. 24, 2022

Related U.S. Application Data

(60) Provisional application No. 63/068,181, filed on Aug. 20, 2020.

(51) Int. Cl.
*B23B 31/30*    (2006.01)
*B08B 9/027*    (2006.01)
(Continued)

(52) U.S. Cl.
CPC .......... *B23B 31/305* (2013.01); *B08B 9/027* (2013.01); *B23Q 3/064* (2013.01); *B08B 9/032* (2013.01); *B23B 2270/027* (2013.01)

(58) Field of Classification Search
CPC . B23B 31/305; B23B 2270/027; B23Q 3/064; B08B 9/027; Y10T 279/17376; Y10T 279/17471
See application file for complete search history.

(56) References Cited

U.S. PATENT DOCUMENTS 2,471,921 A * 5/1949 Ashdown .............. B23B 31/201
279/54
3,250,542 A   5/1966 Franklyn
(Continued)

FOREIGN PATENT DOCUMENTS

CN    105945003 A    9/2016
CN    106511376 A    3/2017
(Continued)

OTHER PUBLICATIONS

European Patent Office, Extended European Search Report for Application 21191101.1-1017 dated Mar. 21, 2022.
(Continued)

*Primary Examiner* — Eric A. Gates
(74) *Attorney, Agent, or Firm* — Yee & Associates, P.C.

(57) ABSTRACT

The present disclosure provides coupling systems for use in industrial systems to removably couple one or more components to the industrial system. The coupling systems discussed herein employ a flexible sleeve in addition to one or more components. The flexible sleeve can have a component disposed therein. When pressure is applied to the flexible sleeve, the flexible sleeve constricts around the component, securing the component in the coupling system and thus to the industrial system. Once the component is secured, the industrial system executes one or more processes on the component. The coupling systems discussed herein can accommodate components of varying internal and external geometries as well as internal and/or external coatings and surface finishes.

24 Claims, 10 Drawing Sheets

(51) Int. Cl.
    *B23Q 3/06*    (2006.01)
    *B08B 9/032*    (2006.01)

(56) References Cited

U.S. PATENT DOCUMENTS

| | | | |
|---|---|---|---|
| 3,641,743 A | 2/1972 | Hoffmann et al. | |
| 3,679,219 A | 7/1972 | Cameron | |
| 5,289,838 A | 3/1994 | Odell | |
| 5,529,635 A | 6/1996 | Odell | |
| 6,015,154 A * | 1/2000 | Andre | B23B 31/305 294/98.1 |
| 8,123,233 B2 * | 2/2012 | Hofmann | B25B 5/065 279/4.12 |
| 8,448,655 B2 | 5/2013 | Suzuki et al. | |
| 8,944,438 B2 * | 2/2015 | Andre | B23B 31/305 279/2.08 |
| 8,960,687 B2 * | 2/2015 | Fuchs | B23Q 3/18 279/132 |
| 10,016,865 B2 * | 7/2018 | Linder | G05D 15/01 |
| 10,486,206 B2 | 11/2019 | Carson | |
| 2009/0000142 A1 | 1/2009 | Churchill et al. | |
| 2010/0050885 A1 | 3/2010 | Vanderstegen-Drake | |
| 2010/0226771 A1 | 9/2010 | Crawford et al. | |
| 2011/0214249 A1 | 9/2011 | McLeod et al. | |
| 2011/0214250 A1 | 9/2011 | McLeod et al. | |
| 2011/0214252 A1 | 9/2011 | McLeod et al. | |
| 2012/0011680 A1 | 1/2012 | Owen et al. | |
| 2013/0011252 A1 | 1/2013 | Crawford et al. | |
| 2013/0323025 A1 | 12/2013 | Crawford et al. | |
| 2013/0323100 A1 | 12/2013 | Poulton et al. | |
| 2014/0137422 A1 | 5/2014 | Gammack et al. | |
| 2014/0141710 A1 | 5/2014 | Turrini-Rochford et al. | |
| 2014/0190523 A1 | 7/2014 | Garvey et al. | |
| 2014/0255173 A1 | 9/2014 | Poulton et al. | |
| 2015/0320268 A1 | 11/2015 | Steele et al. | |
| 2016/0338466 A1 | 11/2016 | Atkinson et al. | |
| 2018/0055212 A1 | 3/2018 | Follows et al. | |
| 2018/0116774 A1 | 5/2018 | Coleman et al. | |
| 2018/0289456 A1 | 10/2018 | Follows et al. | |

FOREIGN PATENT DOCUMENTS

| | | |
|---|---|---|
| CN | 106824909 A | 6/2017 |
| CN | 110788070 A | 2/2020 |
| DE | 102013218747 A1 | 3/2015 |
| GB | 1341996 A | 12/1973 |
| KR | 20150127696 A | 11/2015 |

OTHER PUBLICATIONS

J. C. Kim & K. W. Lee (1990) Experimental Study of Particle Collection by Small Cyclones, Aerosol Science and Technology, 12:4, 1003-1015. O. A. Sinkevich (2006) Mechanisms Leading to Tornado.

Generation and Sustainment, Heat Transfer Research, 2006, vol. 37, No. 8, 731-752.

A. Yu. Varaksin Clusterization of Particles in Turbulent and Vortex Two-phase Flows, published in Teplofizika Vysokikh Temperatur, 2014, vol. 52, No. 5, pp. 777-796.

Spetic Tank TV: "How to Build a 3 Chamber Septic Tank," dated Aug. 15, 2020 (Aug. 15, 2020), XP055876963, Retrieved from Internet: URL: https://www.youtube.com/watch?v=iHzjE-ifDBY [retrieved on Jan. 7, 2022].

Fernco: "Fernco Flexible Coupling Installation," Mar. 26, 2015 (Mar. 26, 2015), XP055876786, Retrieved from the Internet: URL: https://web.archive.org/web/20150326180723/http://www.fernco.com/sites/default/files/literature/fernco_coupling_in-ground_T4614.pdf [retrieved on Jan. 7, 2022].

European Patent Office, The Partial European Search Report for Application 21191101.1-1017 dated Jan. 17, 2022.

* cited by examiner

COUPLING SYSTEMS AND METHODS OF USE THEREOF

FIELD

Aspects of the present disclosure relate to fabrication and processing of components, in particular the ability to position and retain components in industrial systems of various types during use of the industrial systems.

BACKGROUND

Various types of industrial equipment can be employed to fabricate and assemble parts across multiple industries. This industrial equipment can include components having varying geometries one or more internal passages. Similarly, the parts fabricated by this industrial equipment or fabricated in other ways can also include one or more internal passages. Components having one or more internal passages can be fabricated and processed using various methods. The processing can include coating, cleaning, and other operations. During fabrication and processing operations, the components are coupled to various types of equipment that can use harsh chemicals, high temperatures, high pressures, and/or pressure differentials used in various processes. Currently employed methods of coupling components to industrial equipment can damage the component, may create problems for effective processing, or may cause damage to the coupling mechanisms or equipment. Thus, there remains a need for improved systems and methods for coupling components to industrial equipment.

SUMMARY

The present disclosure provides an industrial system in one aspect, the industrial system including: a first chamber having a first side opposite a second side; a second chamber adjacent the first chamber on the first side of the first chamber; and a third chamber adjacent the first chamber on the second side of the first chamber, the first chamber, the second chamber, and the third chamber being in fluid communication. The industrial system further includes a first plate positioned between the first chamber and the second chamber, the first plate having a first aperture formed therethrough; a second plate positioned between the first chamber and the third chamber, the second plate having a second aperture formed therethrough; and a first coupling system removably coupled to the first aperture.

In one aspect, in combination with any example industrial system above or below, the industrial system further includes a second coupling system removably coupled to the second aperture, the first aperture being configured as an inlet, the second aperture being configured as an outlet, the first aperture and the second aperture defining a fluid path from the second chamber to the third chamber through the first chamber.

In one aspect, in combination with any example industrial system above or below, the industrial system further includes that the first coupling system includes a first coupling mechanism configured to accept a component, the first coupling mechanism being positioned in the first aperture.

In one aspect, in combination with any example industrial system above or below, the industrial system further includes that the first coupling system includes a first coupling mechanism configured to accept a component, an attachment fixture removably coupled to the first coupling mechanism, and a rotational element removably coupled to the attachment fixture.

In one aspect, in combination with any example industrial system above or below, the industrial system further includes: a component positioned in the first chamber, the component having: a first end of the component being removably coupled to the first coupling system, a second end of the component being removably coupled to the second coupling system, an inside surface defining an at least one internal passage extending from the first end of the component to the second end of the component, the at least one internal passage being the fluid path between the second chamber and the third chamber.

In one aspect, in combination with any example industrial system above or below, the industrial system further includes: a chamber alignment mechanism coupled to the second chamber, the chamber alignment mechanism being configured to change a position of the second chamber relative its alignment with the first chamber and the third chamber along a central axis.

In one aspect, in combination with any example industrial system above or below, the industrial system further includes that the industrial system is a cleaning system and the component is to be cleaned via the cleaning system and is secured within said first chamber and cleaned using the cleaning system.

The present disclosure provides a coupling system, in one aspect, the coupling system including: a housing having a first end opposite a second end, an inside surface defining an housing cavity, the first end having a first recess and the second end having a second recess; a first coupling mechanism positioned in the first recess. The first coupling mechanism including: a first connector body in contact with the first recess, the first connector body having a first cavity, a first flexible pad disposed concentrically in the first cavity, and a first flexible sleeve disposed concentrically in the first cavity adjacent to the first flexible pad. The coupling system further includes: a second coupling mechanism positioned in the second recess, the second coupling mechanism having: a second connector body in contact with the second recess, the second connector body having a second cavity, a second flexible pad disposed concentrically in the second cavity, and a second flexible sleeve disposed concentrically in the second cavity adjacent to the second flexible pad.

In one aspect, in combination with any example coupling system above or below, the coupling system further includes: the first connector body having a first open end, a second open end, a first inside wall, the first cavity extending from the first open end to the second open end and configured to receive a first end of a component, and a first aperture; the first flexible pad being separated from an inside surface of the first connector body by a first gap, the first gap formed concentrically in and including the inside surface of the first connector body.

In one aspect, in combination with any example coupling system above or below, the coupling system further includes: the first aperture being configured to couple to a first pneumatic system, the first pneumatic system is configured to dispose a first pneumatic media in the first gap to cause the first flexible pad to expand against the first flexible sleeve and cause the first flexible sleeve to apply pressure to the first end of the component to secure the first end of the component in the first coupling mechanism.

In one aspect, in combination with any example coupling system above or below, the coupling system further includes: the second connector body having a first open end, a second open end, a second inside surface, the second cavity extending from the first open end to the second open end and configured to receive a second end of a component, and a second aperture; and a second flexible pad being separated from an inside surface of the second connector body by a second gap, the second gap formed concentrically in and including the inside surface of the second connector body.

In one aspect, in combination with any example coupling system above or below, the coupling system further includes the second aperture being configured to couple to a second pneumatic system configured to dispose a second pneumatic media in the second gap to cause the second flexible pad to expand against the second flexible sleeve and to cause the second flexible sleeve to apply pressure to the second end of the component to secure the second end of the component in the second coupling mechanism.

In one aspect, in combination with any example coupling system above or below, the coupling system further includes: a first gasket being positioned in the first recess of the housing, the first connector body being in contact with the first gasket; and a second gasket being positioned in the second recess of the housing, the second connector body being in contact with the second gasket.

In one aspect, in combination with any example coupling system above or below, the coupling system further includes: a first system connection mechanism and a second system connection mechanism, the first system connection mechanism is coupled to the first end of the housing and the second system connection mechanism is coupled to the second end of the housing, each of the first system connection mechanism and the second system connection mechanism is configured to be removably coupled to a different portion of the coupling system.

In one aspect, in combination with any example coupling system above or below, the coupling system further includes that the housing is formed from a metal selected from the group consisting of steel, aluminum, nickel, copper, brass, titanium and combinations thereof, and each of the first connector body and the second connector body is formed from a metal selected from the group consisting of steel, aluminum, nickel, copper, titanium, brass and combinations and alloys thereof.

In one aspect, in combination with any example coupling system above or below, the coupling system further includes that each of the first flexible pad and the second flexible pad are formed from a flexible material selected from the group consisting of polymers, elastomers, and combinations thereof, and each of the first flexible sleeve and the second flexible sleeve are formed from a flexible material selected from the group consisting of polymers, elastomers, and combinations thereof.

In one aspect, in combination with any example coupling system above or below, the coupling system further includes: a plurality of pressure sensors communicatively coupled to each of a first pneumatic system and a second pneumatic system.

In one aspect, in combination with any example coupling system above or below, the coupling system further includes: a plurality of logic stored on a non-transitory computer-readable medium, and configured to determine a range of pressure to apply via each of a first pneumatic system and a second pneumatic system.

In one aspect, in combination with any example coupling system above or below, the coupling system further includes: a first pneumatic system including a first pneumatic pump, a first pneumatic media supply, a first valve, and a first tube, the first tube being configured to removably couple to a first gap of the first coupling mechanism to supply the first pneumatic media to the first gap; and a second pneumatic system including a second pneumatic pump, a second pneumatic media supply, a second valve, and a second tube, the second tube being configured to removably couple to a second gap of the second coupling mechanism to supply the second pneumatic media to the second gap.

In one aspect, in combination with any example coupling system above or below, the coupling system further includes that a maximum outside diameter of a component is from about 0.25 inches to about 4.0 inches.

The present disclosure provides another coupling system, in one aspect, the coupling system including: a flexible sleeve having a first end, a second end, an outside surface, and an inside surface; a hollow tube wrapped concentrically around the outside surface of the flexible sleeve, the hollow tube having a first pneumatic tube coupled thereto, the first pneumatic tube being further coupled to a first valve, the first valve being coupled to a pneumatic system, and a second pneumatic tube being coupled to a second valve, the hollow tube being configured to constrict around the flexible sleeve in response to having a pneumatic media from the pneumatic system disposed therein; an attachment fixture, the first end of the flexible sleeve being removably coupled to the attachment fixture; and a rotational element, the rotational element being removably coupled to the attachment fixture and configured to rotate the attachment fixture about a central axis.

In one aspect, in combination with any example coupling system above or below, the coupling system further includes: a component having a first end coupled to the flexible sleeve, in response to the hollow tube constricting around the flexible sleeve, the inside surface of the flexible sleeve being in contact with the component.

In one aspect, in combination with any example coupling system above or below, the coupling system further includes that a component coupled to the flexible sleeve is not in contact with the attachment fixture.

In one aspect, in combination with any example coupling system above or below, the coupling system further includes that the flexible sleeve being formed from a polymer, elastomer, or combinations thereof, and a hollow tube being formed from a polymer, elastomer, or combinations thereof.

In one aspect, in combination with any example coupling system above or below, the coupling system further includes the hollow tube further including a metallic wire.

In one aspect, in combination with any example coupling system above or below, the coupling system further includes that the flexible sleeve includes a plurality of securing elements disposed concentrically around the outside surface, and the hollow tube is configured to removably couple to one or more of the plurality of securing elements.

In one aspect, in combination with any example coupling system above or below, the coupling system further includes a plurality of pressure sensors configured to determine a pressure exerted on a component positioned inside of the flexible sleeve when the pneumatic media is delivered to the hollow tube.

In one aspect, in combination with any example coupling system above or below, the coupling system further includes a vent (configured to release cleaning media from the coupling system.

In one aspect, in combination with any example coupling system above or below, the coupling system further includes that the first end of the flexible sleeve has a first diameter, the second end of the flexible sleeve has a second diameter, the first diameter being larger than the second diameter.

The present disclosure provides a method of using coupling systems, in one aspect, the method of using coupling systems including: removably coupling a first coupling system to a first aperture of a first plate at a top of a first chamber of a system; removably coupling a second coupling system to a second aperture of a second plate at a bottom of the first chamber; inserting a first end of a component in an opening of the first coupling system; applying, via a first pneumatic system, a first pressure to secure the first end of the component to the first coupling system; executing a plurality of logic stored on a computer-readable medium while the component is secured to the first coupling system and the second coupling system; subsequent to executing the plurality of logic, deactivating the first pneumatic system to remove pressure from the first end of the component to decouple the first end from the first coupling system; and removing the component from the industrial system.

In one aspect, in combination with any example method above or below, the method further includes that the industrial system has a second chamber coupled to the first aperture of the first plate, the first plate is a first divider between the first chamber and the second chamber; and a third chamber coupled to the second aperture of the second plate, and the second plate is a second divider between the first chamber and the third chamber, the first aperture and the second aperture defining a fluid path through the first chamber.

In one aspect, in combination with any example method above or below, the method further includes: prior to executing the plurality of logic, inserting a second end of the component in an opening of the second coupling system; applying, via a second pneumatic system, a second pressure to secure the second end of the component to the second coupling system; and subsequent to executing the plurality of logic, deactivating the second pneumatic system to remove pressure from the second end of the component to decouple the second end from the second coupling system.

In one aspect, in combination with any example method above or below, the method further includes that the first pressure is from about 1 kilopascal (KPa) to about 200 Kpa and the second pressure is from about 1 Kpa to about 200 Kpa.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1A:
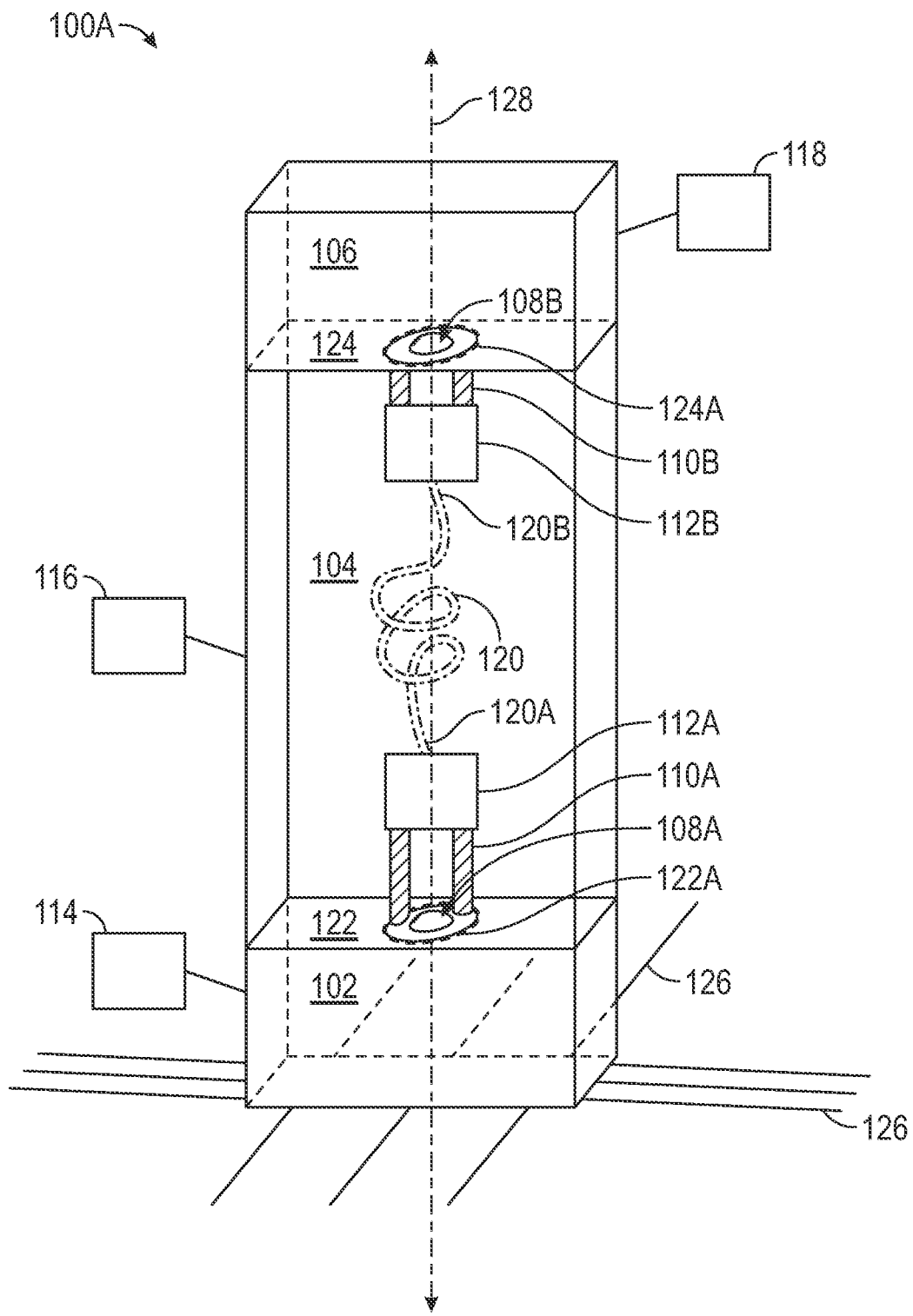
FIG. 1A depicts a first industrial system including one or more coupling systems according to aspects of the present disclosure.

The present disclosure describes coupling systems for coupling components to various types of industrial systems. As used herein, a "coupling system" includes one or more elements configured to permanently or removably couple one or more components, to be cleaned or otherwise processed, to an industrial system. As used here, "removably coupled" is used to refer to the coupling of two or more elements, such as a coupling mechanism and a component, or individual elements of a coupling mechanism, or a coupling mechanism and an industrial system, which can subsequently be un-coupled without damage to either coupled element. As used herein, an "industrial system" includes one or more pieces of industrial equipment configured to fabricate, assemble, mark, coat, clean, inspect, or otherwise manufacture various industrial or consumer products. The coupling systems discussed herein are configured to retain components in environments that can include one or more of temperature differentials, pressure differentials, harsh (corrosive) chemicals, oils, or other aspects that can make securing components to the industrial systems challenging. Further, the coupling systems discussed herein secure the components in the industrial system without impeding one or more processes executed by the industrial system and without damaging the component nor the coupling systems.

In one example, a component to be cleaned or otherwise processed and having one or more internal passage can be coupled to cleaning equipment and held in position during one or more cleaning operations of the component and employing a pressure differential and/or using cleaning media (e.g., any type of media configured to remove contaminants) to clean the internal passage and/or an outside surface of the component. The coupling systems discussed herein can form a seal with one or more elements of the cleaning equipment, enabling the temperature and/or pressure differential to be created and maintained. In one example, the coupling systems are used in industrial systems where a pressure differential is created. In this example, a first end of a component is coupled to a region of the cleaning equipment having atmospheric pressure (about 1 atmosphere (atm)) using a first coupling system. As used herein, "about" can mean two or more values within 10%, 7%, 5%, 3%, or 1% of each other. A second end of the component is coupled to a region of the cleaning equipment having a vacuum pressure (e.g., from about $1\times10^{-3}$ Pa to about $1\times10^5$ Pa) using a second coupling system. Thus, each of the first and the second coupling systems secure each of the first end and the second end of the component to its respective region of the industrial system to secure the component for processing. In some examples, each coupling system further forms a seal with each region to maintain the respective pressure in each region. If cleaning media is used on the internal passage or on the outside surface of the component, the mechanical integrity of the coupling systems are not negatively affected by this cleaning media.

In some examples, pneumatic devices can be employed in the coupling systems discussed herein. One or more ends of a component can be removably coupled to industrial equipment using one or more coupling systems. In one example, a coupling system includes a rubber pad that presses against the tubular member and can be actuated pneumatically to increase the contact pressure and achieve desired clamping performance. While pneumatic mechanisms are discussed herein, hydraulic pressure, solenoids, electro-magnetic actuators, or mechanical actuators (springs) can be used in addition to or instead of the pneumatic mechanisms. In this example, a gasket is incorporated to act as a seal prevent any leakage from the coupling mechanism assembly. The coupling systems are quick-connect and quick-release mechanisms, enabling the component to be rapidly removably coupled to and uncoupled from the coupling system using one hand, two hands (e.g., a single operator), a single tool, or two tools simultaneously. Rapid coupling is achieved by inserting one end of the tube in the desired cavity and increasing the clamping force through pneumatic pressure exerted through a cavity positioned behind the rubber pad. Rapid uncoupling is achieved by reducing the pressure in this cavity. Components having a range of diameters, e.g., from about 0.25 inches (in.) outside diameter to about 4 in. outside diameter can easily be accommodated through use of cylindrical sleeve inserts of various wall thickness.

In another example of a coupling system, at least one end of a component to be cleaned or otherwise processed can be inserted into a flexible sleeve. The flexible sleeve has hollow tubing coupled thereto. The hollow tubing can follow a helical path along the sleeve axis. In one example, the hollow tubing is coupled to a pressurized system, such as a pneumatic system. By changing pneumatic pressure in this integrated hollow tubing the same can be tightened around the tube component and the flexible sleeve to provide necessary clamping force. This will allow fast coupling and uncoupling and also accommodate components of various diameters easily for superior cleaning because of the flexible nature of the sleeve material. The sleeve material could be an elastomeric fabric that may be reinforced with suitable fiber materials for enhanced durability and life. Components having a range of diameters, e.g., from an outside diameter of about 0.25 inches (in.) to an outside diameter of about 4 in. can be accommodated through use of the flexible sleeves. In addition, components having different outside diameters, e.g., a first outside diameter on a first end and a second outside diameter on a second end, can be coupled to equipment using the various types of coupling mechanisms discussed herein.

In one example, the coupling systems discussed herein include elements which couple directly to a component, to be cleaned or otherwise processed, and to the industrial equipment. The coupling systems can be seated in one or more apertures of the industrial equipment. In other examples, the coupling systems further include attachment fixture configured to enable components of varying lengths and geometries to couple to various types of equipment for superior cleaning. These attachment fixtures are discussed in detail below.

The coupling systems discussed herein can be used in multi-chamber systems, as discussed above, which employ temperature and/or pressure differentials for various processes. The industrials systems suitable for use of the coupling mechanisms discussed herein can also be configured to be adjustable along one or more axes, for example, to accommodate components having twists, bends, kinks, right angles, tapered ends, tapered middle portions, or other geometries. Example industrial systems are discussed below. The coupling systems can further accommodate components having various textures, porosities, three-dimensional features, surface finishes, or other coatings on one or both of the internal or external surfaces of the component.

Industrial Systems Including Coupling Systems

FIG. 1A depicts a first industrial system 100A including one or more coupling systems according to aspects of the present disclosure. The first industrial system 100A can be a cleaning system including a first chamber 104, and a second chamber 102 separated from the first chamber 104 by a first plate 122. The first plate 122 acts as a divider between the first chamber 104 and the second chamber 102 to assist in maintaining one or more of a temperature, a pressure, or a chemical environment in each of the first chamber 104 and the second chamber 102. The first plate 122 can include one or more apertures 122A configured to promote coupling of a component 120, to be cleaned or otherwise processed, to the first industrial system 100A via a first coupling system. In the example in FIG. 1A, a first end 120A of the component 120 is removably coupled to a first coupling mechanism 112A of the first coupling systems. The first coupling mechanism 112A can be configured in various manners, as discussed in detail below. In some examples, the first coupling mechanism 112A can be removably coupled to a first attachment fixture 110A. The first coupling mechanism 112A can be configured as one or more support rods, as shown in FIG. 1A, or otherwise configured depending upon the example. The first attachment fixture 110A, as well as other attachment fixtures discussed herein, can removably couple to the first coupling mechanism 112A via means such as mechanical, electrical, adhesive or epoxy (chemical), magnetic, or combinations of means. In some examples, the first coupling system further includes a first rotational element 108A. The first rotational element 108A can be removably coupled to the first attachment fixture 110A via means such as mechanical, electrical, adhesive or epoxy (chemical), magnetic, or combinations of means. The first rotational element 108A can be configured to rotate 360 degrees around a central axis 128 of the first industrial system 100A in order to accommodate components (e.g., the component 120 to be cleaned) of varying geometries and configurations. Thus, when either the first attachment fixture 110A or the first coupling mechanism 112A is removably coupled to the first rotational element 108A, the first coupling mechanism 112A can accommodate a variety of geometries of components. Each of the first attachment fixture 110A and the first rotational element 108A can be formed from a metal selected from the group consisting of steel, aluminum, nickel, copper, titanium, brass and combinations and alloys thereof. The material can be selected based upon factors such as the processes being executed by the first industrial system 100A including process media (e.g., chemical and electrochemical compatibility considerations of the process media), the dimensions or geometry of the component being processed in the first industrial system 100A, the material the component is formed from, or other factors. In one example, the first attachment fixture 110A and the first rotational element 108A are formed from the same material(s). In another example, the first attachment fixture 110A and the first rotational element 108A are formed from at least one different material(s). The materials used to form the first coupling mechanism 112A are discussed in detail below in FIGS. 2A-2C.

In some examples, a first plurality of peripheral systems 116 can be coupled to the first chamber 104. The first plurality of peripheral systems 116 can include one or more of pressure systems and controls or temperature systems and controls. The first plurality of peripheral systems 116 can additionally or alternatively include one or more vessels configured to store and transport media such as cleaning media or process media selected to interact with one or more components 120 to be cleaned and that can be positioned in the first chamber 104. A "cleaning media" can include any type of material intended to and capable of removing contaminants from a component or chamber. A "process media" can include any type of media intended to perform functions other than cleaning, such as formation of a coating on or in the component 120, or to enable other processes such as component fabrication or marking. A second plurality of peripheral systems 114 can be coupled to the second chamber 102. The second plurality of peripheral systems 114 can include one or more of pressure systems and controls or temperature systems and controls configured to affect a pressure, temperature, and/or contents of the second chamber 102. The second plurality of systems 114 can additionally or alternatively include one or more vessels configured to store and transport media such as cleaning or process media.

The first industrial system 100A can further include a third chamber 106 separated from the first chamber 104 by a second plate 124 that acts as a second divider between the first chamber 104 and the third chamber 106. The second plate 124 can include one or more apertures 124A configured to promote coupling of a component 120 to the first industrial system 100A via a second coupling system. In the example in FIG. 1A, a second end 120B of the component 120 is removably coupled to a second coupling system having a second coupling mechanism 112B. The second coupling mechanism 112B can be configured in various manners, as discussed in detail below. The second coupling system can further include a second coupling mechanism 112B removably coupled to a second attachment fixture 110B. The second attachment fixture 110B can be configured as one or more rods, as shown in FIG. 1A, or otherwise configured depending upon the example. In some examples, which can be combined with other examples herein, the second coupling system further includes a second rotational element 108B removably coupled to the second attachment fixture 110B. The second rotational element 108B can be configured to rotate 360 degrees around a central axis 128 of the first industrial system 100A in order to accommodate components of varying geometries and configurations.

Each of the second attachment fixture 110B and the second rotational element 108B can be formed from a metal selected from the group consisting of steel, aluminum, nickel, copper, titanium, brass and combinations and alloys thereof. The material can be selected based upon factors such as the processes being executed by the first industrial system 100B including process media (e.g., chemical and electrochemical compatibility considerations of the process media), the dimensions or geometry of the component being processed in the first industrial system 100B, the material the component is formed from, or other factors. In one example, the second attachment fixture 110B and the second rotational element 108B are formed from the same material(s). In another example, the second attachment fixture 110B and the second rotational element 108B are formed from at least one different material(s). The materials used to form the second coupling mechanism 112B are discussed in detail below in FIGS. 2A-2C.

A third plurality of peripheral systems 118 can be coupled to the third chamber 106. The third plurality of peripheral systems 118 can include one or more of pressure systems and controls, temperature systems and controls configured to affect a pressure and/or temperature of the third chamber 106, and/or filtering systems. The third plurality of peripheral systems 118 can additionally or alternatively include one or more vessels configured to retain and transport media such as cleaning or processing media. The third plurality of peripheral systems 118 can further be configured to remove and/or process cleaning or processing media from the third chamber 106 and dispose of the media, or return the media to the first chamber 104 or the second chamber 102.

In one example, the first chamber 104, the second chamber 102, and the third chamber 106 can be aligned along the central axis 128. The second chamber 102 can be removably coupled to a chamber alignment mechanism 126. In one example, the chamber alignment mechanism 126 can be configured as a plurality of tracks extending from the industrial system 100A in various directions. The second chamber 102 can be slidingly engaged with the chamber alignment mechanism 126, facilitating movement of the second chamber 102 relative to the first chamber 104 and the third chamber 106 in order to accommodate components (e.g., the component 120) of varying geometries and configurations.

In one example, the first industrial system 100A can be a cleaning system having a pressure differential formed from the second chamber 102 to the third chamber 106. In another example, which can be combined with other examples herein, the first industrial system 100A can be a cleaning system having a temperature differential formed from the second chamber 102 to the third chamber 106. In other examples, the first industrial system 100A can be a coating system, a marking system, an inspection system, or other fabrication system.

Figure 1B:
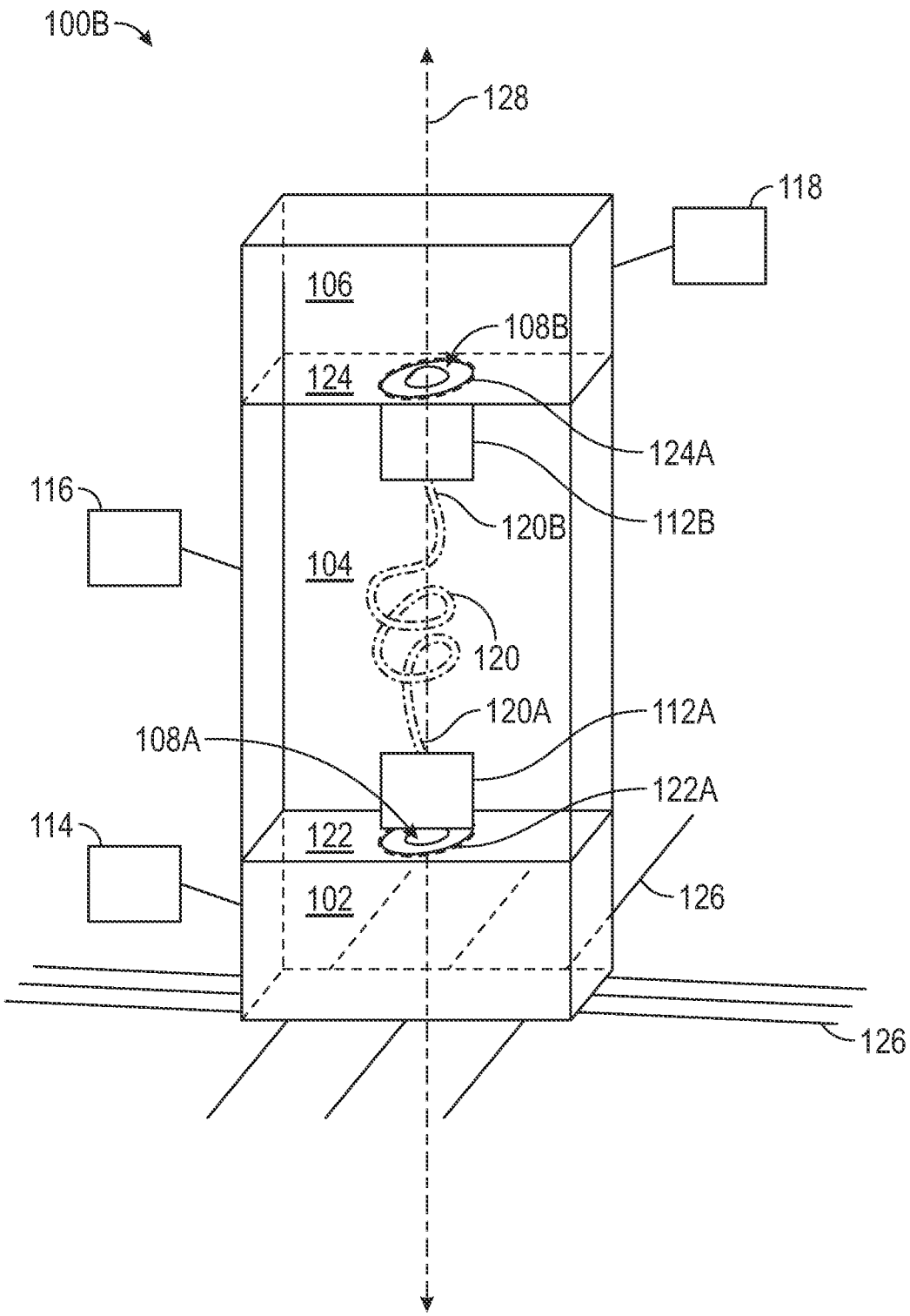
FIG. 1B depicts a second industrial system including one or more coupling systems according to aspects of the present disclosure.

FIG. 1B depicts a second industrial system 100B including one or more coupling systems according to aspects of the present disclosure. The second industrial system 100B is similar to the first industrial system 100A. However, in contrast to the first industrial system 100A, the first end 120A of the component 120 for cleaning or other processing in FIG. 2B is removably coupled to the first plate 122 of the second industrial system 100B using a first coupling system including a first coupling mechanism 112A that is removably, and directly, coupled to a first rotational element 108A. Thus, the first coupling system in FIG. 1B does not include the first attachment fixture 110A as included in the first coupling system discussed in FIG. 1A. Similarly, the second end 120B of the component 120 in FIG. 2B is removably coupled to the second plate 124 of the second industrial system 100B using a first coupling system including a second coupling mechanism 112B that is removably, and directly, coupled to a second rotational element 108B. Thus, the second coupling system in FIG. 1B does not include the second attachment fixture 110B as included in the second coupling system discussed in FIG. 1A. Similarly to what is discussed with respect to FIG. 1A above, in one example, the second industrial system 100B can be a cleaning system having a pressure differential formed from the second chamber 102 to the third chamber 106. In another example, which can be combined with other examples herein, the second industrial system 100B can be a cleaning system having a temperature differential formed from the second chamber 102 to the third chamber 106. In other examples, the second industrial system 100B can be a marking system, inspection system, coating system, or other fabrication system.

Figure 1C:
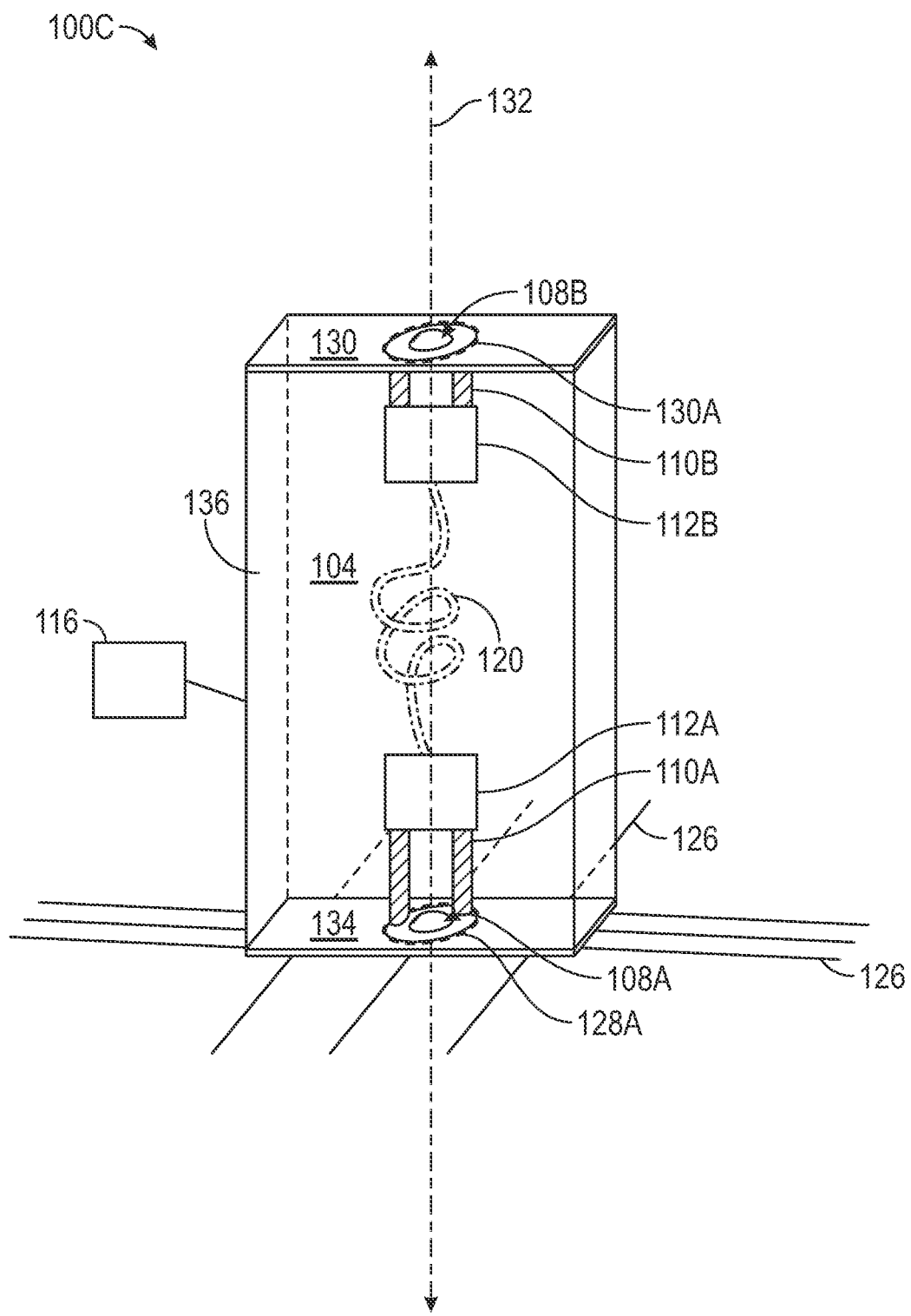
FIG. 1C depicts a third industrial system including one or more coupling mechanisms according to various aspects of the present disclosure.

FIG. 1C depicts a third industrial system 100C including one or more coupling systems according to various aspects of the present disclosure. The third industrial system 100C can include a first chamber 104, a first plate 134 coupled to a first end of the first chamber 104 and a second plate 130 coupled to a second end of the first chamber 104 opposite the first plate 134. In some example, the first chamber 104 is an open chamber, having only the first plate 134 and the second plate 130 and no sidewalls. In other examples, which can be combined with other examples herein, the first chamber 104 is a closed or partially closed chamber, having at least one sidewall 136, the first plate 134 and the second plate 130. The first chamber 104 of each of the first industrial system 100A and the second industrial system 100B may be similarly configured with respect to the presence or absence of sidewalls.

When the first chamber 104 of the third industrial system 100C includes all sidewalls 136 such that it is a closed chamber without open sides, the first plate 134 and the second plate 130, in combination with the sidewalls 136, are configured to enable the first chamber 104 to have at least one of a temperature, pressure, or chemically-controlled environment. The first plate 134 can include one or more apertures 128A configured to promote coupling of a component 120 to the third industrial system 100C via a first coupling system. In the example in FIG. 1C, a first end 120A of the component 120 is removably coupled to the first coupling system that includes a first coupling mechanism 112A. The first coupling mechanism 112A can be configured in various manners, as discussed in detail below. In some examples, the first coupling system further includes a first coupling mechanism 112A can be optionally removably coupled to a first attachment fixture 110A, which can be configured as one or more rods, as shown in FIG. 1C, or otherwise configured depending upon the example. In some examples, the first coupling system further includes a first rotational element 108A can be removably coupled to the first attachment fixture 110A. The first rotational element 108A can be configured to rotate 360 degrees around a central axis 132 of the third industrial system 100C in order to accommodate components (e.g., the component 120) of varying geometries and configurations.

A first plurality of peripheral systems 116 can be coupled to the first chamber 104. The first plurality of peripheral systems 116 can include one or more of pressure systems and controls, temperature systems and controls, and/or media such as cleaning media or processing media (discussed above) designed to interact with one or more components 120 that can be positioned in the first chamber 104.

The second plate 130 can include one or more apertures 130A configured to promote coupling of a component 120 to the third industrial system 100C via a second coupling system. In the example in FIG. 1C, a second end 120B of the component 120 is removably coupled to a second coupling system having a second coupling mechanism 112B. The second coupling mechanism 112B can be configured in various manners, as discussed in detail below. The second coupling system can further include a second coupling mechanism 112B removably coupled to a second attachment fixture 110B. The second attachment fixture 110B can be configured as one or more rods, as shown in FIG. 1C, or otherwise configured depending upon the example. In some examples, the second coupling system further includes a second rotational element 108B removably coupled to the second attachment fixture 110B. The second rotational element 108B can be configured to rotate 360 degrees around a central axis 132 of the third industrial system 100C in order to accommodate components (e.g., the component 120) of varying geometries and configurations.

In one example, the first plate 134 of the first chamber 104, can be slidingly engaged with the chamber alignment mechanism 126 to enable movement of the first chamber 104 relative to the central axis 132 in order to accommodate components (e.g., the component 120) of varying geometries and configurations. Further, in some examples, the chamber alignment mechanism 126 can be used to move the entire structure (the first plate 134, the second plate 130, as well as coupling systems and components coupled thereto) of the third industrial system 100C among and between operations, e.g., for inspection, marking, or other processes.

In one example, the third industrial system 100C can be a cleaning system having an increasing or decreasing pressure differential formed in the first chamber 104 from the first plate 134 to the second plate 130. In another example, which can be combined with other examples herein, the third industrial system 100C can be a cleaning system having an increasing or decreasing temperature differential from the first plate 134 to the second plate 130. In other examples, the third industrial system 100C can be a marking system, coating system, inspection system, or other fabrication system.

It is to be appreciate that the component 120 to be cleaned or otherwise processed is shown in each of FIGS. 1A, 1B, and 1C, but that no component may not be present in each industrial system as-fabricated regardless of whether or not one or more coupling systems are assembled thereto. That is, each of the first industrial system 100A, the second industrial system 100B, and the third industrial system 100C can be fabricated and sold by an original equipment manufacturer (OEM) to include one or more coupling systems, or without the coupling systems, which can be separately fabricated and distributed. In one example, when a component to be cleaned is secured any of the industrial systems discussed above, processes can be performed on the outside surface, inside surface, or a combination of surfaces enabling superior cleaning of inside and/or outside of the component to be cleaned.

Depending upon the example industrial system, or more coupling systems as discussed herein can be employed to secure the component 120 to an industrial system. Further, the one or more coupling systems can be used to form a seal with one or more plates (122, 124 or 134, 130) in order to maintain one or more of a pressure, a temperature, or a chemical environment (e.g., formed from a cleaning media or other processing media) in one or more chambers discussed above. The coupling systems are configured to withstand varying process conditions without negatively affecting the component integrity.

Couple Mechanisms for Use in Coupling Systems

Figure 2A:
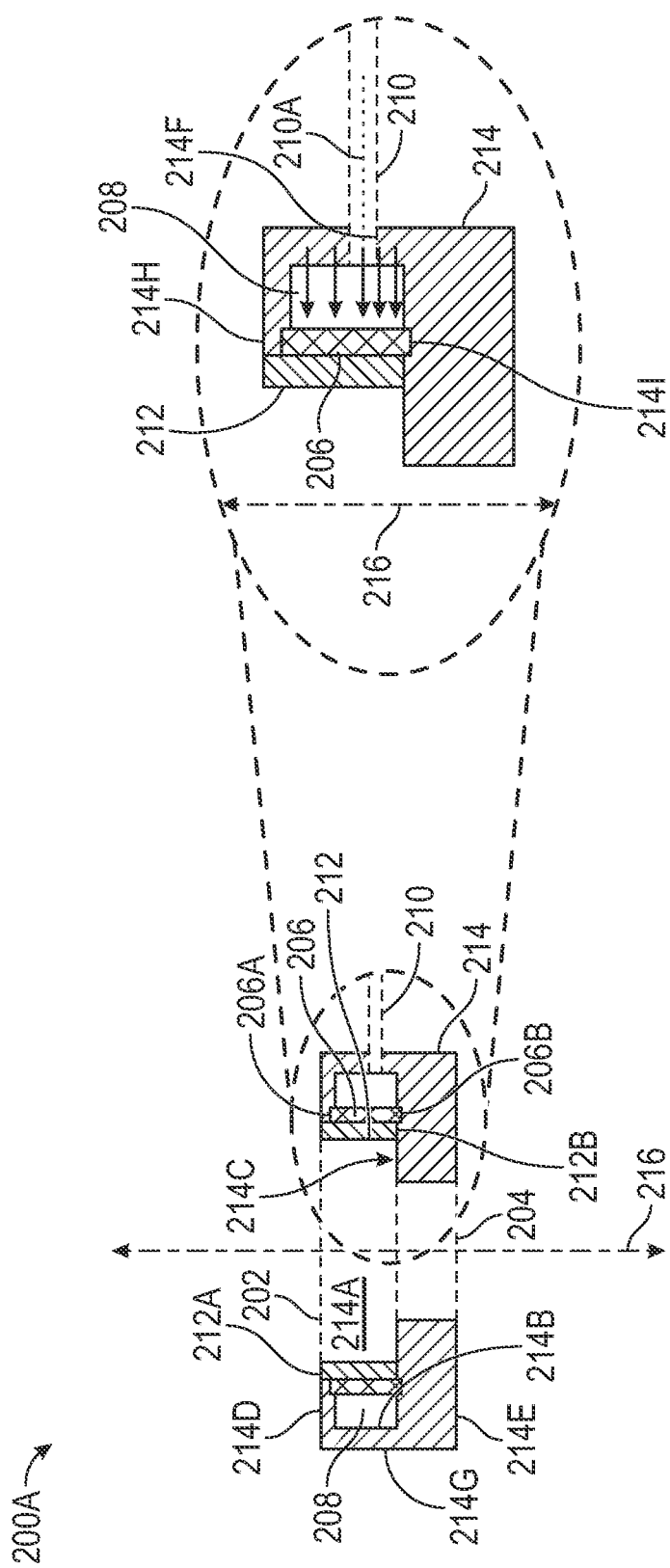
FIG. 2A depicts a cross-sectional view coupling system according to aspects of the present disclosure.
Figure 2B:
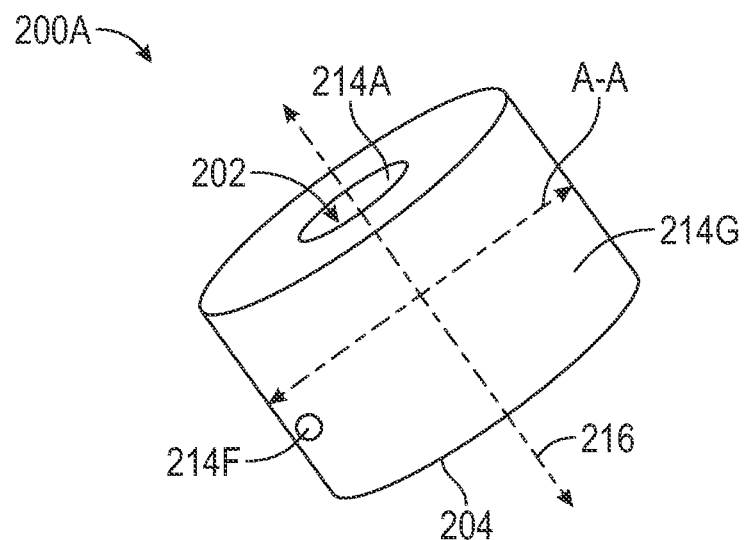
FIG. 2B depicts a perspective view of the coupling system of FIG. 2A according to aspects of the present disclosure.
Figure 2C:
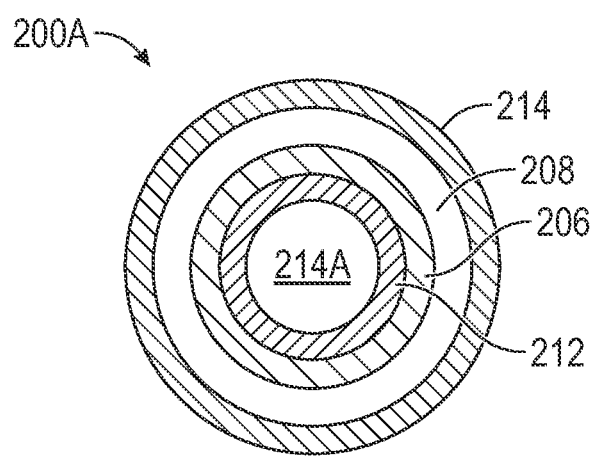
FIG. 2C depicts a top cross-sectional view of the coupling system of FIG. 2A according to aspects of the present disclosure.

FIGS. 2A, 2B, and 2C depict views of a coupling system according to aspects of the present disclosure. FIG. 2A illustrates a cross section of a coupling mechanism 200A of a coupling system along a central axis 216 of the coupling mechanism 200A. The coupling mechanism 200A includes a plurality of annular members including a connector body 214, a flexible pad 206, and a sleeve 212. The connector body 214 includes a first open end 202, a second open end 204 opposite the first open end 202. In one example, the second open end 204 can be configured to accept components having an outside end diameter from about 0.25 inches (in.) to about 4 in. In other examples, the second open end 204 can be configured to accept an outside end diameter from about 0.5 in. to about 3 in. In yet other examples, the second open end 204 can be configured to accept an outside end diameter from about 0.75 in. to about 2 in. A cavity 214A is formed in the connector body 214 and extends from the first open end 202 to the second open end 204. The connector body 214 is further defined by an inside surface 214B, a top surface 214D, a bottom cavity surface 214C, a bottom connector surface 214E, and an outside surface 214G of the connector body 214. An aperture 214F is formed in the outside surface 214G. The aperture 214F is configured to accept a plurality of tooling and tubing. The connector body 214 can be formed from one or more of steel, aluminum, nickel, copper, titanium, brass and combinations and alloys and combinations thereof. The material from which the connector body 214, or other connector bodies discussed herein, can be selected based upon factors such as the processes being executed in an industrial system to which the coupling mechanism 200A is secured, including process media (e.g., chemical and electrochemical compatibility considerations of the process media), the dimensions or geometry of the component being processed in the industrial system to which the coupling mechanism 200A is secured, the material other components of the coupling mechanism 200A are formed from, the material the component is formed from, or other factors.

In some examples, the flexible pad 206 can be seated in a recess 214I of the connector body 214. In other examples, when no recess 214I is present, the flexible pad 206 can be seated on the bottom cavity surface 214C. The flexible pad 206 can be formed from one or more polymers, elastomers such as neoprene, isoprene, butyl rubber, silicone rubbers, and combinations thereof. The material from which the flexible pad 206, or other flexible pads discussed herein, is formed can be selected based upon factors such as the processes being executed in an industrial system to which the coupling mechanism 200A is secured, including process media, the material(s) selected for other components of the coupling mechanism 200A, the dimensions or geometry of the component being processed in the industrial system to which the coupling mechanism 200A is secured, the material the component is formed from, or other factors.

The flexible pad 206 can, in some examples, be further reinforced with plastic, ceramic, or metallic nanoparticles, or combinations thereof. The flexible pad 206 can be secured to the connector body 214 by various means including press-fit, adhesives, epoxies or other chemical means, spring-loaded mechanisms, magnetic mechanisms, or other mechanical, electrical, or combinations of means. The sleeve 212 can, in some examples, be further reinforced with plastic, ceramic, or metallic nanoparticles, or combinations thereof. The sleeve 212 can be further reinforced with plastic, ceramic, or metallic nanoparticles. The sleeve 212 can be secured to the connector body 214 and to the flexible pad 206 by various means including press-fit, adhesives, epoxy or other chemical means, spring-loaded mechanisms, magnetic mechanisms, or other mechanical, electrical, or combinations of means.

In one example, the flexible pad 206 is formed from a material having at least one of a higher density or a higher yield strength as compared to the material from which the sleeve 212 is formed. In one example, a ratio of the yield strength of the flexible pad 206 to the yield strength of the sleeve 212 is from about 1:1 to about 15:1. In another example, a ratio of the yield strength of the flexible pad 206 to the yield strength of the sleeve 212 is from about 4:1 to about 10:1. In yet another example, a ratio of the yield strength of the flexible pad 206 to the yield strength of the sleeve 212 is from about 5:1 to about 8:1. In one example, each of the sleeve 212 and the flexible pad 206 can be formed from material capable of maintaining its mechanical properties from a temperature of about −75° F. (about −59° C.) to about 322° F. (about 161° C.). In another example, each of the sleeve 212 and the flexible pad 206 can be formed from material capable of maintaining its mechanical properties from a temperature of about −60° F. to about 225° F. In still another example, each of the sleeve 212 and the flexible pad 206 can be formed from material capable of maintaining its mechanical properties from a temperature of about −50° F. to about 175° F. In one example, the flexible pad 206 is positioned in the cavity 214A of the connector body 214 such that a gap 208 is formed circumferentially in between the flexible pad 206 and the inside surface 214B of the connector body 214. The sleeve 212 is positioned in the cavity 214A in contact with the flexible pad 206.

The inset drawing in FIG. 2A illustrates an example of the coupling mechanism 200A with tubing 210 coupled to the aperture 214F. The tubing 210 is coupled to a vessel (not shown separately here) configure to deliver media 210A such as liquid, gas, particulate, or combinations thereof to the gap 208. The delivery of media 210A to the gap 208 causes a buildup of pressure in the gap 208, which causes the flexible pad to expand inward towards the central axis 216, impinging on the sleeve 212 and causing the sleeve to expand inward into the cavity 214A. In one example, a component (not shown here) is inserted through the second open end 204 into the cavity 214A. When the gap 208, which is an annual gap extending around the inside surface 214B of the connector body 214, is pressurized by the introduction of media into the aperture 214F, causing the flexible pad 206 to exert pressure on the sleeve 212. When the sleeve 212 expands into the cavity 214A, it acts to secure the component in the cavity 214A.

As shown in FIG. 2A, in one example of the coupling mechanism 200A, a top surface 212A of the sleeve 212 can be co-planar with the top surface 214D of the connector body 214. In another example, which can be combined with other examples herein, a bottom surface 212B of the sleeve 212 can be co-planar with and positioned on the bottom cavity surface 214C. Further as shown in FIG. 2A, a top surface 206A of the flexible pad 206 is not co-planar with the top surface 214D of the connector body 214, but is instead located under a lip 214H (shown in the inset of FIG. 2A) of the connector body 214. Further, a bottom surface 206B of the flexible pad is co-planar with and positioned on the bottom cavity surface 214C. In other examples, the lip 214H can extend inward towards the central axis 216 such that both the sleeve 212 and the flexible pad 206 are positioned underneath and in contact with the lip 214H. In FIG. 2A, the sleeve 212 and the flexible pad 206 are shown have substantially the same thickness. In other examples, a ratio of the thickness of the flexible pad 206 to the sleeve 212 can be from about 1.1:1 to about 10:1. In still other examples, a ratio of the thickness of the flexible pad 206 to the sleeve 212 can be from about 2:1 to about 8:1. In yet other examples, a ratio of the thickness of the flexible pad 206 to the sleeve 212 can be from about 4:1 to about 6:1. In still other examples, the flexible pad 206 can be thinner than the sleeve 212. In these examples a ratio of the thickness of the flexible pad 206 to the sleeve 212 can be from about 1:1.1 to about 1:10. In still other examples, a ratio of the thickness of the flexible pad 206 to the sleeve 212 can be from about 1:2 to about 1:8. In yet other examples, a ratio of the thickness of the flexible pad 206 to the sleeve 212 can be from about 1:4 to about 1:6. The relative thicknesses of the flexible pad 206 and the sleeve 212 can depend upon factors including the material each is formed from and the mechanism (solenoid, pneumatics, magnetics, etc.) by which the sleeve 212 is constricted.

FIG. 2B is a perspective view of the coupling mechanism 200A in FIG. 2A. FIG. 2B illustrates the central axis 216, the first open end 202, the second open end 204, the cavity 214A extending there between, the outside surface 214G, and the aperture 214F. While the outside surface 214G is shown as being a smooth surface, in other examples, FIG. 2C is a top-view cross-section along line A-A of the coupling mechanism 200A as shown in FIG. 2B. FIG. 2C shows the plurality of annular members discussed in detail in FIG. 2A, including the cavity 214A, the sleeve 212, the flexible pad 206 in contact with the sleeve 212, and the gap 208 formed between the flexible pad 206 and the connector body 214.

Figure 2D:
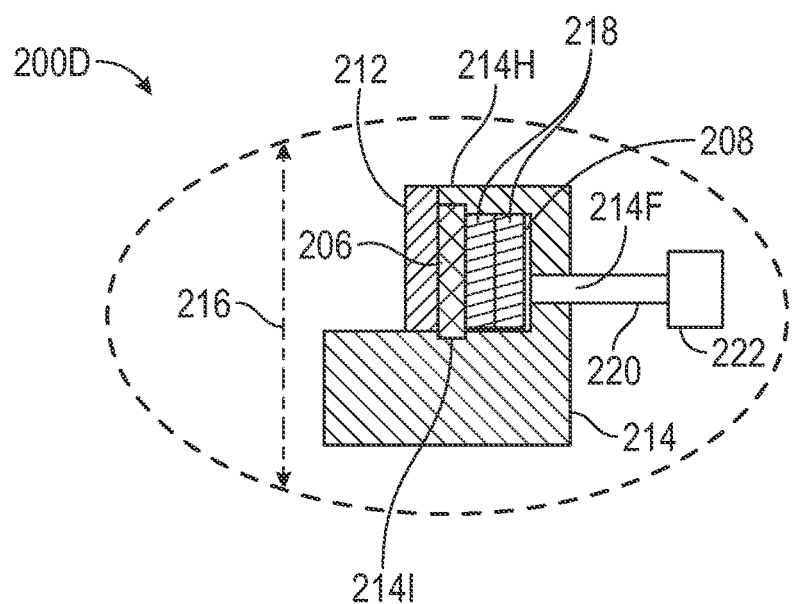
FIG. 2D depicts a partial cross sectional view of another coupling mechanism according to aspects of the present disclosure.

FIG. 2D depicts a partial cross sectional view of another coupling mechanism 200D. The coupling mechanism 200D includes elements similar to the coupling mechanism 200A, and includes the connector body 214, the sleeve 212, and the flexible pad 206. However, instead of an empty gap 208, the coupling mechanism 200D has an electromagnetically-actuated solenoid 218 having one or more coils disposed in the gap 208. Accordingly, the aperture 214F in FIG. 2D is configured to receive an electrical lead 220 that is connected to a power source 222. When the power source 222 is activated, it applies a current to the electromagnetically actuated solenoid 218 positioned in the gap 208. The solenoid 218 applies pressure to the flexible pad 206 which applies pressure to the sleeve 212 that can constrict around a component positioned in the coupling mechanism 200D. The solenoid 218 can be configured as a split-ring as discussed above.

Figure 2E:
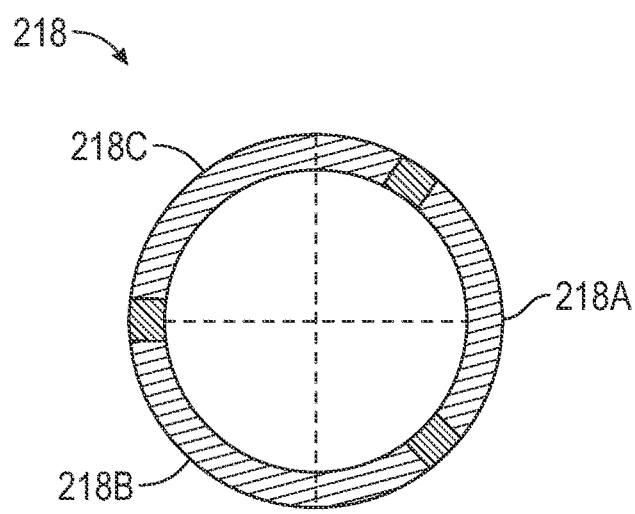
FIG. 2E depicts an example solenoid for use in coupling systems according to aspects of the present disclosure.
Figure 2F:
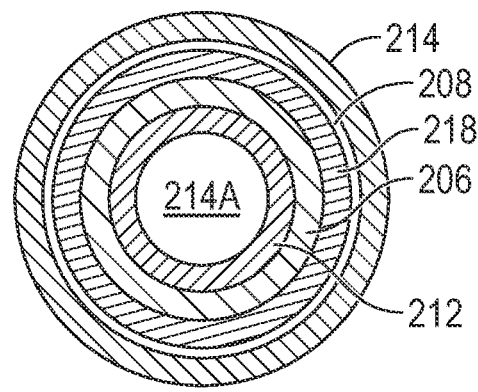
FIG. 2F depicts a top-view cross-section of a coupling mechanism included in coupling systems according to aspects of the present disclosure.

The solenoid 218 in FIG. 2D is shown in FIG. 2E as being a split ring having a first segment 218A, a second segment 218B, and a third segment 218C. In other examples, the solenoid 218 can have more or less segments than depicted herein. FIG. 2F is a top-view cross-section of the coupling mechanism 200D as shown in FIG. 2D. FIG. 2F shows the plurality of annular members discussed in detail in FIG. 2D, including the cavity 214A, the sleeve 212, the flexible pad 206 in contact with the sleeve 212, and the solenoid 218 disposed in the gap 208 in between the flexible pad 206 and the connector body 214.

In one example, a coupling system includes a single coupling mechanism 200A used to secure one end of a component. In other examples, a coupling system can include two or more coupling mechanisms 200A. In still other examples, a coupling system can include elements in addition to one or more coupling mechanisms 200A. An example coupling system that incorporates the coupling mechanism 200A is discussed in FIG. 3 below.

Coupling Systems for Use in Industrial Systems

Figure 3:
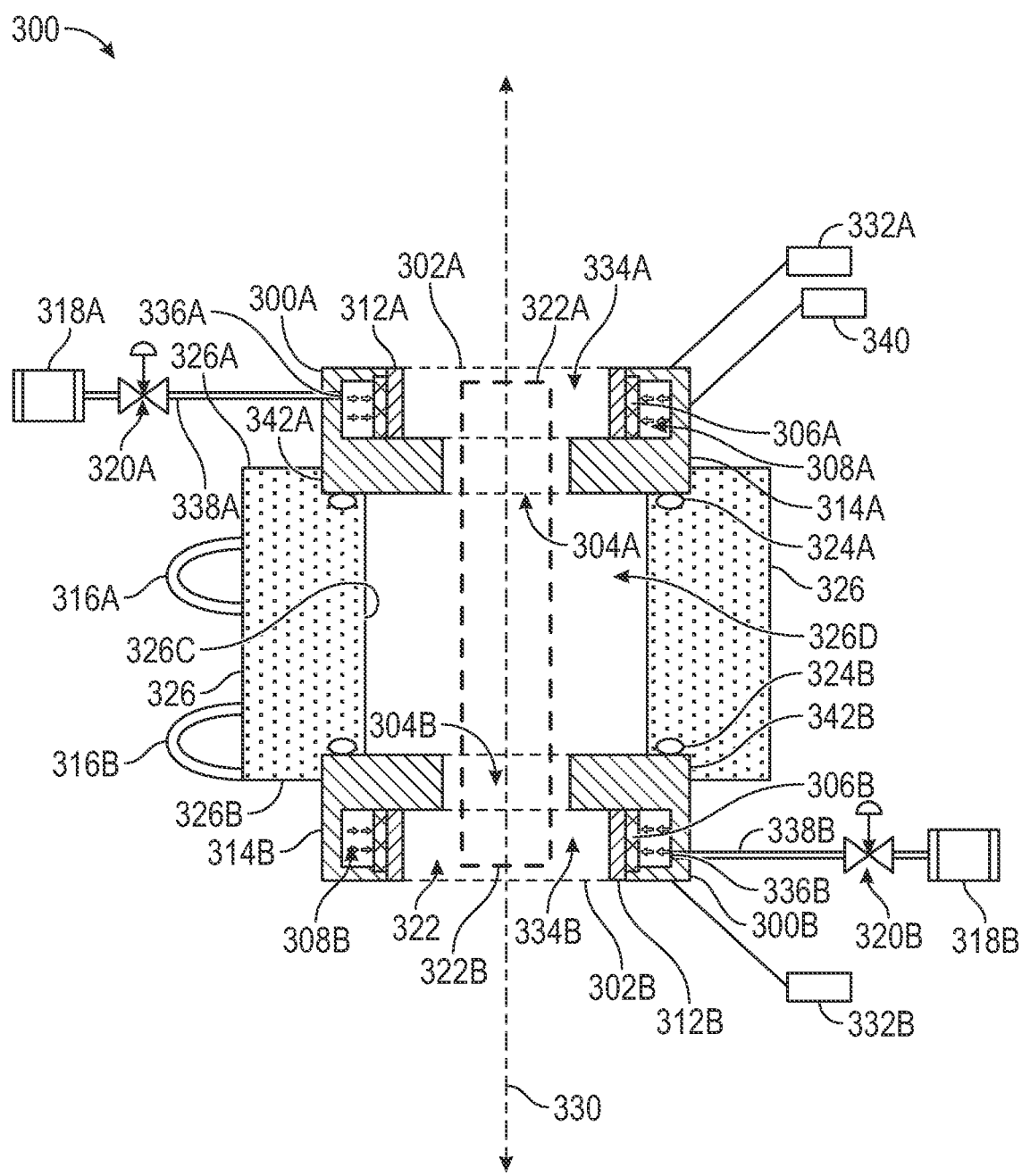
FIG. 3 illustrates a cross section of a coupling system according to aspects of the present disclosure.

FIG. 3 illustrates a cross section of a coupling system 300 having a central axis 330. In one example, the coupling system 300 includes a first coupling mechanism 300A and a second coupling mechanism 300B. Each of the first coupling mechanism 300A and the second coupling mechanism 300B can be configured similarly to the coupling mechanism 200A discussed above. In some examples, the first coupling mechanism 300A and the second coupling mechanism 300B are coupled together via a connector housing 326. The first coupling mechanism 300A can be coupled to the connector housing 326 via means including press-fit, adhesive, epoxy, magnetic, electric, or other mechanical means or combinations of means. The connector housing 326 can be formed from various materials, including one or more of metals, polymers, elastomers, ceramics, or combinations thereof. The material from which the connector housing 326, or other connector housings discussed herein, is formed can be selected based upon factors such as the processes being executed in an industrial system to which the coupling system 300 is secured, including process media, the material(s) selected for other components of the coupling system 300, the operating parameters (e.g., pressure) of the coupling system 300, the dimensions or geometry of the component being processed in the industrial system to which the coupling system 300 is secured, the material the component is formed from, or other factors. In some examples, the connector housing 326 can be formed from materials configured to expand at least along the direction of the central axis 330 to accommodate components of varying lengths and geometries.

The first coupling mechanism 300A includes a plurality of annular members including a first connector body 314A, a first flexible pad 306A, and a first sleeve 312A. The first connector body 314A includes a first open end 302A and a second open end 304A opposite the first open end 302A. In one example, the first open end 302A and the second open end 304A can be of varying diameters. In another example, the first open end 302A and the second open end 304A can have substantially the same diameter, e.g., the diameter of the first open end 302A is within about 10%, 7%, 5%, 3%, or 1% of the diameter of the second open end 304A. A first cavity 334A is formed in the first connector body 314A and extends from the first open end 302A to the second open end 304A.

In one example, the second open end 304A and the first cavity 334A can be configured to accept components having an outside end diameter from about 0.25 inches (in.) to about 4 in. In other examples, the second open end 304A and the first cavity 334A can be configured to accept an outside end diameter from about 0.5 in. to about 3 in. In yet other examples, the second open end 304A and the first cavity 334A can be configured to accept an outside end diameter from about 0.75 in. to about 2 in. The first connector body 314A includes a first aperture 336A formed therein and configured to accept and retain a plurality of tooling and tubing, as discussed in detail below. The first connector body 314A can be formed from one or more of steel, aluminum, nickel, copper, titanium, brass and combinations and alloys and combinations thereof. The first flexible pad 306A can be formed from one or more polymers, elastomers such as neoprene, isoprene, butyl rubber, silicone rubbers, and combinations thereof. The first sleeve 312A can be formed from one or more polymers, elastomers such as neoprene, isoprene, butyl rubber, silicone rubbers, and combinations thereof. The first connector body 314A, the first sleeve 312A, and the first flexible pad 306A can be formed materials similar to those materials discussed above in FIG. 2A. The first flexible pad 306A is circumferentially positioned in the first cavity 334A of the first connector body 314A to form a first gap 308A in between the first flexible pad 306A and the first connector body 314A. The first sleeve 312A is positioned in the first cavity 334A in contact with the first flexible pad 306A.

In one example, the first coupling mechanism 300A is seated on a first gasket 324A positioned in a first recess 342A. The first gasket 324A is positioned between the first coupling mechanism 300A and a first end 326A of the connector housing 326. The first gasket 324A can be formed from various flexible materials such as polymers and elastomers. In some examples of the coupling system 300, the first gasket 324A is not present. In some examples, a first system connection mechanism 316A extends from the connector housing 326 and is configured to couple to a portion of an industrial system to secure the coupling system 300 to the industrial system. The first system connection mechanism 316A can be formed from various materials including metals, polymers, ceramics, or elastomers, and, in some examples, can be formed from two or more materials. The first system connection mechanism 316A can connect to the industrial system using press-fit, mechanical, magnetic, electrical, or combinations of means.

The first aperture 336A of the first coupling mechanism 300A is configured to couple to a system such as a first pneumatic system 318A including at least a pneumatic pump and a pneumatic media supply. The first pneumatic system 318A is coupled to a first valve 320A that is used to regulate the pneumatic media transported through a first tube 338A that is coupled to the first aperture 336A to transport pneumatic media into the first gap 308A. The pneumatic media applies pressure to the first flexible pad 306A to apply pressure to the first sleeve 312A which expands to secure a first end 322A of a component 322 disposed in the first coupling mechanism 300A. This pressure secures the first end 322A of the component 322 to the industrial system so that one or more processes can be executed by the industrial system while the component is retained in its position within the industrial system. While pneumatic media is discussed herein as being the mechanism which causes the first gap 308A to expand, ultimately causing the first end 322A of the component 322 to be secured in the first coupling mechanism 300A, in other examples, media including magnetic particles that repel from the metallic (first connector body 314A) portion towards the central axis 330 may also be used. The industrial systems discussed herein can be cleaning systems employing pressure differentials to transport cleaning media.

The coupling system 300 further includes plurality of logic stored on a first non-transitory computer-readable medium 332A. The plurality of logic can be configured as a plurality of programs that can, based on an RFID chip or other identification mechanism, determine a range of pressure to apply to the first coupling mechanism 300A via the first pneumatic system 318A. The coupling system 300 further includes a plurality of sensors 340. The plurality of sensors 340 can include pressure sensors that are in communication with the computer readable mediums 332A, 332B, as well as the pneumatic systems 318A, 318B, that act in concert to execute various programs to apply pressure to and remove pressure from components (322) positioned in the coupling system 300. In one example, the range of pressure applied via the delivery of pneumatic media to the first gap 308A is from about 1 kilopascal (Kpa) to about 200 Kpa. In another example, the range of pressure applied via the delivery of pneumatic media to the first gap 308A is from about 2 Kpa to about 150 Kpa. In still another example, the range of pressure applied via the delivery of pneumatic media to the first gap 308A is from about 1 Kpa to about 140 Kpa. The pressure applied can be selected based upon factors including the type of process being performed, one or more materials forming elements of the coupling system 300, the geometry, dimensions, or constituent materials of the component 322, or other factors or combinations of factors.

The second coupling mechanism 300B is configured similarly to the first coupling mechanism 300A and is secured to the coupling system 300 via second end 326B of the connector housing 326. The second coupling mechanism 300B includes a plurality of annular members including a second connector body 314B, a second flexible pad 306B, and a second sleeve 312B. The second connector body 314B includes a first open end 302B, a second open end 304B opposite the first open end 302B. In one example, the second open end 304B can be configured to accept components having an outside end diameter from about 0.25 inches (in.) to about 4 in. In other examples, the second open end 304B can be configured to accept an outside end diameter from about 0.5 in. to about 3 in. In yet other examples, the second open end 304B can be configured to accept an outside end diameter from about 0.75 in. to about 2 in. A second cavity 334B is formed in the second connector body 314B and extends from the first open end 302B to the second open end 304B.

The second connector body 314B includes a second aperture 336B formed therein and configured to accept a plurality of tooling and tubing. The second connector body 314B can be formed from one or more of steel, aluminum, nickel, copper, titanium, brass and combinations and alloys and combinations thereof. The second flexible pad 306B can be formed from one or more polymers, elastomers such as neoprene, isoprene, butyl rubber, silicone rubbers, and combinations thereof. The second sleeve 312B can be formed from one or more polymers, elastomers such as neoprene, isoprene, butyl rubber, silicone rubbers, and combinations thereof. The second connector body 314B, the second sleeve 312B, and the second flexible pad 306B can be formed materials similar to those materials discussed above in FIG. 2A. The second flexible pad 306B is positioned in the second cavity 334B of the second connector body 314B to form a second gap 308B (circumferentially) in between the second flexible pad 306B and the second connector body 314B. The second sleeve 312B is positioned in the second cavity 334B in contact with the second flexible pad 306B.

The second coupling mechanism 300B is seated on a second gasket 324B positioned in a second recess 342B. The second gasket 324B is positioned in between the second coupling mechanism 300B and a second end 326B of the connector housing 326. The second coupling mechanism 300B can be coupled to the connector housing 326 via means including press-fit, adhesive, epoxy, magnetic, electric, or other mechanical means or combinations of means. A second industrial system connection mechanism 316B extends from the connector housing 326 and is configured to couple to a portion of an industrial system to secure the coupling system 300 to the industrial system. The second system connection mechanism 316B can be formed from various materials including metals, polymers, ceramics, or elastomers, and, in some examples, can be formed from two or more materials. The first system connection mechanism 316B can connect to the industrial system using mechanical, magnetic, electrical, or combinations of means.

The second aperture 336B of the first coupling mechanism 300A is configured to couple to a system such as a second pneumatic system 318B including at least a pneumatic pump and a pneumatic media supply. The second pneumatic system 318B is coupled to a second valve 320B that is used to regulate the pneumatic media transported through a second tube 338B that is coupled to the second aperture 336B to transport pneumatic media into the second gap 308B to apply pressure to the second flexible pad 306B to apply pressure to the second sleeve 312B which expands to secure a second end 322B of a component 322 disposed in the second coupling mechanism 300B.

In one example, the coupling system 300 further includes plurality of logic stored on a second non-transitory computer-readable medium 332B. The plurality of logic can be configured as a plurality of programs that can, based on an RFID chip or other identification mechanism, determine a range of pressure to apply to each of the first coupling mechanism 300A and the second coupling mechanism 300B via, respectively, each of the first pneumatic system 318A and the second pneumatic system 318B. In other examples, the first non-transitory computer-readable medium 332A can be used to operate the second coupling mechanism 300B including the second pneumatic system. In one example, the range of pressure applied via the delivery of pneumatic media to the second gap 308B is from about 1 kilopascal (Kpa) to about 200 Kpa. In another example, the range of pressure applied via the delivery of pneumatic media to the second gap 308B is from about 2 Kpa to about 150 Kpa. In still another example, the range of pressure applied via the delivery of pneumatic media to the second gap 308B is from about 1 Kpa to about 140 Kpa. When each of the first coupling mechanism 300A and the second coupling mechanism 300B are coupled to the connector housing 326, a housing cavity 326D is formed therein, the cavity being defined by an inside surface 326C of the connector housing 326. The component 322 extends from the first coupling mechanism 300A to the second coupling mechanism 300B and is secured therein using, in this example, pneumatic pressure. One or both pneumatic systems (318A, 318B) can be activated to created pressure in one or both gaps (308A, 308B), to secure one or both ends (322A, 322B) in the coupling system 300.

Figure 4A:
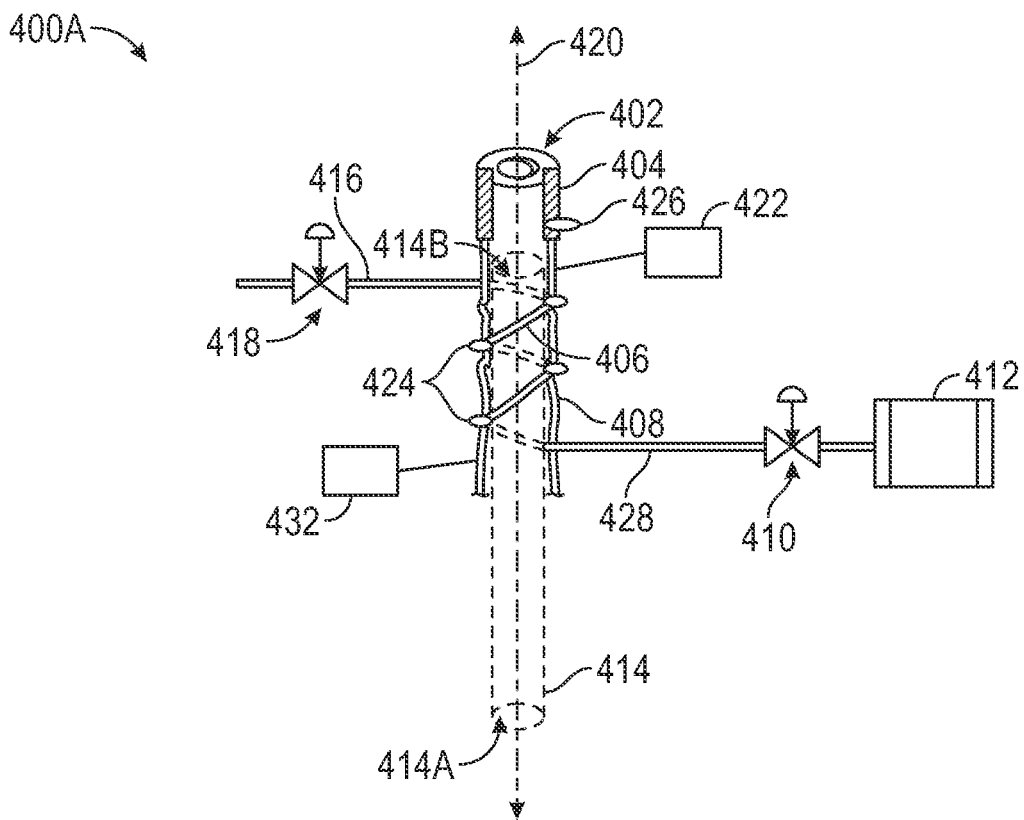
FIG. 4A depicts another example of a coupling system according to aspects of the present disclosure.

FIG. 4A depicts another example coupling system 400A according to aspects of the present disclosure. The coupling system 400A includes a flexible sleeve 408 coupled to an attachment fixture 404. The flexible sleeve 408 is discussed in detail in the perspective view in FIG. 4B. The attachment fixture 404 can be coupled to a rotational element 402, configured to rotate up to 360 degrees about a central axis 420. In some examples, the coupling system 400A does not include the attachment fixture 404, such that the flexible sleeve 408 is directly coupled to the rotational element 402. Each of the attachment fixture 404 and the rotational element 402 can be formed from a metal selected from the group consisting of steel, aluminum, nickel, copper, titanium, brass and combinations and alloys thereof. The material from the attachment fixture 404 and the rotational element 402 is formed can be selected based upon factors such as the processes being executed in an industrial system to which the coupling system 400 is secured, including process media (e.g., chemical and electrochemical compatibility considerations of the process media), the material(s) selected for other components of the coupling system 400, the operating parameters (e.g., pressure) of the coupling system 400, the dimensions or geometry of the component being processed in the industrial system to which the coupling system 400 is secured, the material the component is formed from, or other factors.

The In one example, the attachment fixture 404 and the rotational element 402 can each be formed from the same material. In another example, the attachment fixture 404 and the rotational element 402 can each be formed from at least one different material, for example, when two or more materials are used to form either element. At least one hollow tube 406 is coupled to the outside of the flexible sleeve 408. The combination of the flexible sleeve 408 and the hollow tube 406 can be collectively referred to as a "coupling mechanism" in the context of the example coupling system 400 in FIG. 4A. In one example, each of the flexible sleeve 408 and the hollow tube 406 are each formed from a flexible material such as one or more polymers, elastomers such as neoprene, isoprene, butyl rubber, silicone rubbers, and combinations thereof. In one example, the hollow tube 406 is integral to, e.g., formed with and/or permanently coupled to, the flexible sleeve 408. This may be accomplished, for example, via injection molding or other methods.

In one example, the hollow tube 406 is removably coupled to the flexible sleeve 408 using an adhesive, an epoxy, or other chemical means. In another example, the hollow tube 406 is removably coupled to the flexible sleeve 408 using a plurality of securing elements 424 that can be spaced in a variety of configurations. The plurality of securing elements 424 can include mechanical, magnetic, electronic, or other combinations of means. The plurality of securing elements 424 can be a part of the hollow tube 406 or the flexible sleeve 408. In another example, the plurality of securing elements 424 can include portions positioned on each of the hollow tube 406 and the flexible sleeve 408 that are configured to removably couple to each other. The hollow tube 406 is coupled to a pneumatic system 412, a valve 410 is coupled to the pneumatic system 412 for pressure control, e.g., to control a flow of pneumatic media into a first pneumatic tube 428. The pneumatic system 412 fills the hollow tube 406 with pneumatic media which puts pressure on the flexible sleeve 408. When a component 414 is positioned inside of the flexible sleeve 408, the flexible sleeve 408 is secured to the component 414 when pressure is applied to the hollow tube 406 as the hollow tube 406 constricts around the component 414.

The coupling system 400 further includes a second pneumatic tube 416 coupled to the hollow tube 406. The second pneumatic tube 416 is further coupled to a second valve 418 which acts to release the pressure created by the pneumatic system 412. In one example, the coupling system 400 further includes plurality of logic stored on a second non-transitory computer-readable medium 422. The plurality of logic can be configured to determine a range of pressure to apply via the pneumatic system 412 and to monitor the pressurization of the hollow tube 406. In one example, a plurality of sensors 436 can be included in the coupling system 400. The plurality of sensors 436 can include pressure sensors that are in communication with the plurality of logic 422, as well as the pneumatic system 412, to execute various programs to apply pressure to and remove pressure from components (414) positioned in the coupling system 400. The plurality of logic can be further configured to determine a rate at which to pressurize and depressurize the hollow tube 406. In one example, the range of pressure applied by the pneumatic system 412 is from about 1 KPa to about 200 KPa. In one example, the range of pressure applied by the pneumatic system 412 is from about 2 KPa to about 150 KPa. In one example, the range of pressure applied by the pneumatic system 412 is from about 1 KPa to about 140 KPa. The pressure applied can be selected based upon factors including the type of process being performed, one or more materials forming elements of the coupling system 400, the geometry, dimensions, or constituent materials of the component 414, or other factors or combinations of factors.

The industrial system to which the coupling system 400 is removably coupled can include a variety of types of industrial systems, as discussed above. In some examples, the component 414 is a hollow component secured on at least one end via the coupling system 400. In this example, a cleaning media can be used to clean an internal passage of the component 414. Thus, the cleaning media may be removed via a second end 414A of the component 414, which can be an open end. In another example, the coupling system 400 includes a vent 426 that can be used alone or while coupled to a vacuum system or other system in order to remove cleaning media from the component. In this example, the cleaning media may exit through a first end 414B of the component 414 and then be removed via the vent 426.

FIG. 4A illustrates a coupling system 400 including a flexible sleeve 408 and hollow tube 406. However, in other examples, two or more flexible sleeves and hollow tubes can be used to secure multiple ends or other regions of a component in order to perform one or more processes on the component. The two or more flexible sleeves having hollow tubes can be coupled to distinct pneumatic systems, or can be coupled to the same pneumatic system 412 discussed above.

Figure 4B:
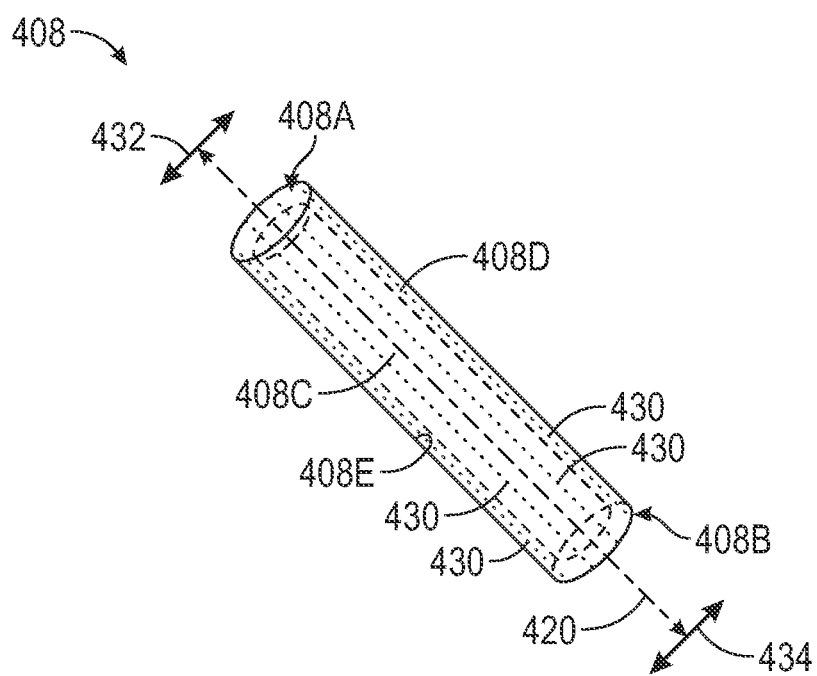
FIG. 4B depicts another example of perspective view of a coupling system according to aspects of the present disclosure.

FIG. 4B depicts a perspective view of a flexible sleeve 408 used in coupling systems according to aspects of the present disclosure. The flexible sleeve 408 includes a first end 408A opposite a second end 408B, an outside surface 408D and an inside surface 408E defining a cavity 408C. The first end 408A can be an open end or a closed end, depending upon the example. In some examples, the first end 408A can be configured to transition from an open end to a closed end, and vice-versa. The first end 408A has a first outside diameter 432. The second end 408B has a second outside diameter 434. In some examples, the first outside diameter 432 can be larger than the second outside diameter by about 10% to about 90%. In other examples, the first outside diameter 432 can be larger than the second outside diameter by about 20% to about 80%. In other examples, the first outside diameter 432 can be larger than the second outside diameter by about 30% to about 60%.

The cavity 408C of the flexible sleeve 408 is configured to receive a portion of a component such as the component 414 discussed in FIG. 4A. Further illustrated in FIG. 4B is a plurality of shaping mechanisms 430. While four shaping mechanisms 430 are shown in FIG. 4B, more or less can be employed depending upon the embodiment. The plurality of shaping mechanisms 430 can include metal wires. In one example, the metal wire(s) of the shaping mechanisms 430 can be metallic and can act as a part of the plurality of securing elements 424.

The coupling systems above can be used in conjunction with pneumatic systems, in other examples, hydraulic pressure, electro-magnetic actuators, or mechanical actuators (springs) can be used in addition to or instead of the pneumatic mechanisms discussed above. One or more coupling mechanisms can be used as a part of the coupling systems above to secure one or more ends or other portions of a component during one or more cleaning processes or other fabrication processes.

Methods of Use of Coupling Systems in Industrial Systems

Figure 5:
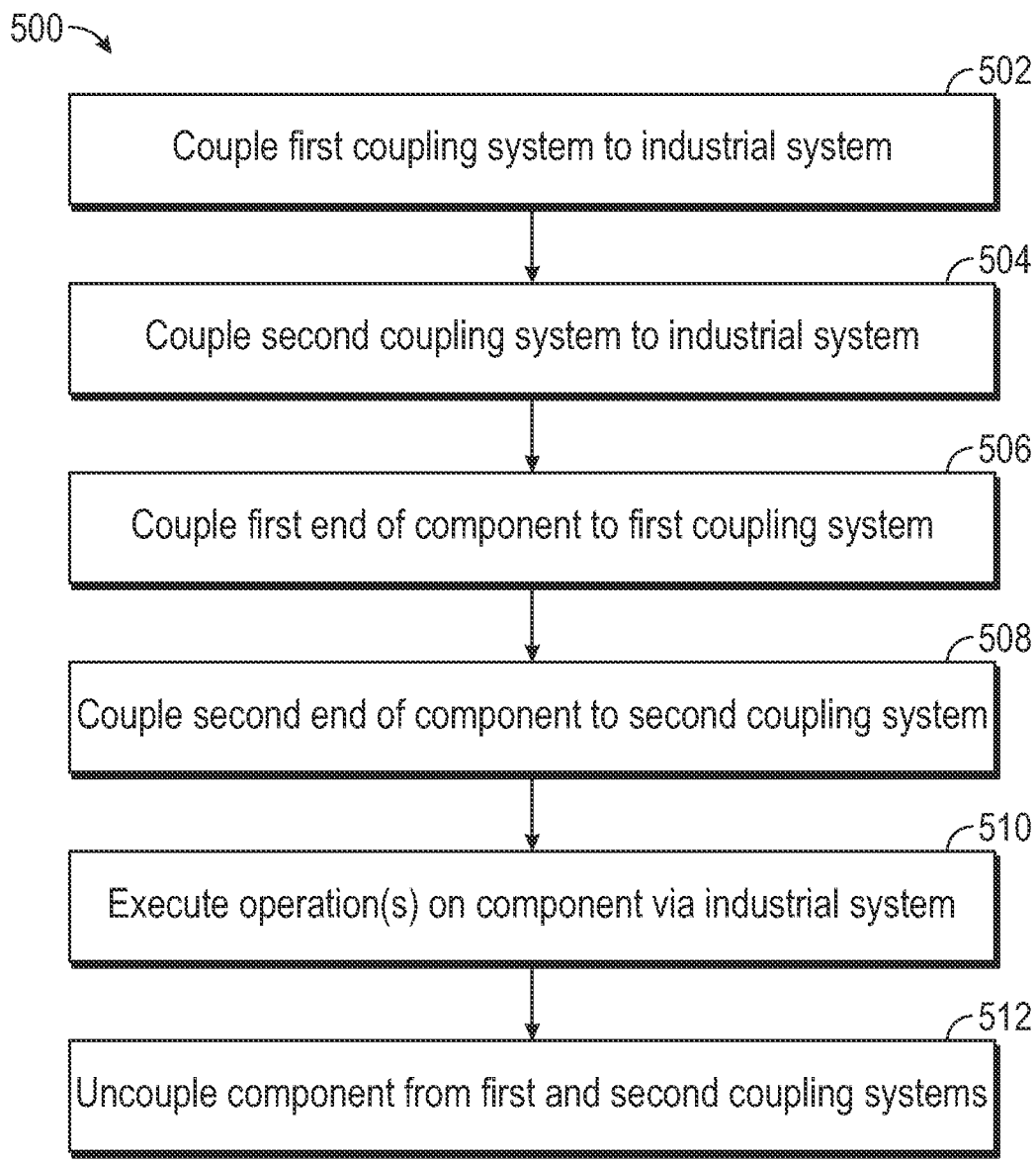
FIG. 5 depicts a flow chart of a method of using coupling systems according to aspects of the present disclosure.

FIG. 5 depicts a flow chart of a method 500 of using coupling systems according to embodiments of the present disclosure. At operation 502 (502—Couple first coupling system to industrial system), a first coupling system including one or more of the elements discussed above (e.g., a coupling mechanism, an attachment fixture, and/or a rotational element) is removably coupled to an industrial system. At operation 504 (504—Couple second coupling system to industrial system), a second coupling system including one or more of the elements discussed above is removably coupled to the industrial system. In one example, operations 502 and 504 can occur simultaneously. For example, a fixture can be employed to pick and place both of the first and the second coupling systems simultaneously in each respective plate or other position as discussed herein. In one example, the first coupling system and the second coupling system can include the same elements. In another example, the first coupling system and the second coupling system can include different elements. In one example, at either or both of operations 502 and 504, coupling the respective coupling system to the industrial system forms a seal such that a pressure, temperature, or chemical environment is able to be formed and maintained during use of the industrial system.

At operation 506 (506—Couple second coupling system to industrial system), a first end of a first component is removably coupled to the first coupling system to secure the first end of the first component to the industrial system. In one example, operation 506 includes inserting a first end of a component in an opening of the first coupling system and applying, via a first pneumatic system, a first pressure to secure the first end of the component to the first coupling system At operation 508 (508—Couple second coupling system to industrial system), a second end of the first component is removably coupled to the second coupling system to secure the second end of the first component to the industrial system. In one example, operation 508 includes inserting a second end of a component in an opening of the second coupling system and applying, via a second pneumatic system, a second pressure to secure the second end of the component to the second coupling system. In one example, the first pressure is greater than the second pressure by more than about 5%. In another example, the first pressure is less than the second pressure by more than about 5%. In yet another example, the first pressure is substantially the same (e.g., within 5%, 3%, or 1%) of the second pressure.

At operation 510 (510—Execute operation(s) on component via industrial system), one or more processes is executed via the industrial system. The operations executed at operation 510 can be in the form of programs stored as a plurality of logic such as a cleaning program, a manufacturing program (e.g., marking, coating, etc.) or an inspection program. The first and second coupling systems are configured to withstand vacuum pressures from about $1\times10^{-3}$ Pa to about $1\times10^{5}$ Pa as well as temperatures from about −75° F. to about 322° F., and chemical environments of varying pH levels. At operation 512 (512—Uncouple component from first and second coupling systems), subsequent to completion of one or more processes at operation 510, the first component is uncoupled from the first coupling system and the second coupling system and removed from the industrial system. In one example, operation 512 includes deactivating the first pneumatic system to remove pressure from the first end of the component to decouple the first end from the first coupling system, and removing the component from the industrial system. In some examples, operation 512 further includes deactivating the second pneumatic system to remove pressure from the second end of the component to decouple the second end from the second coupling system, and removing the component from the industrial system.

Subsequently, the first component can be reconfigured and re-coupled to the industrial system. In other examples, a second component can be coupled to the industrial system and the method 500 can be repeated, where the same process(es) or different processes are executed at operation 510.

Figure 6:
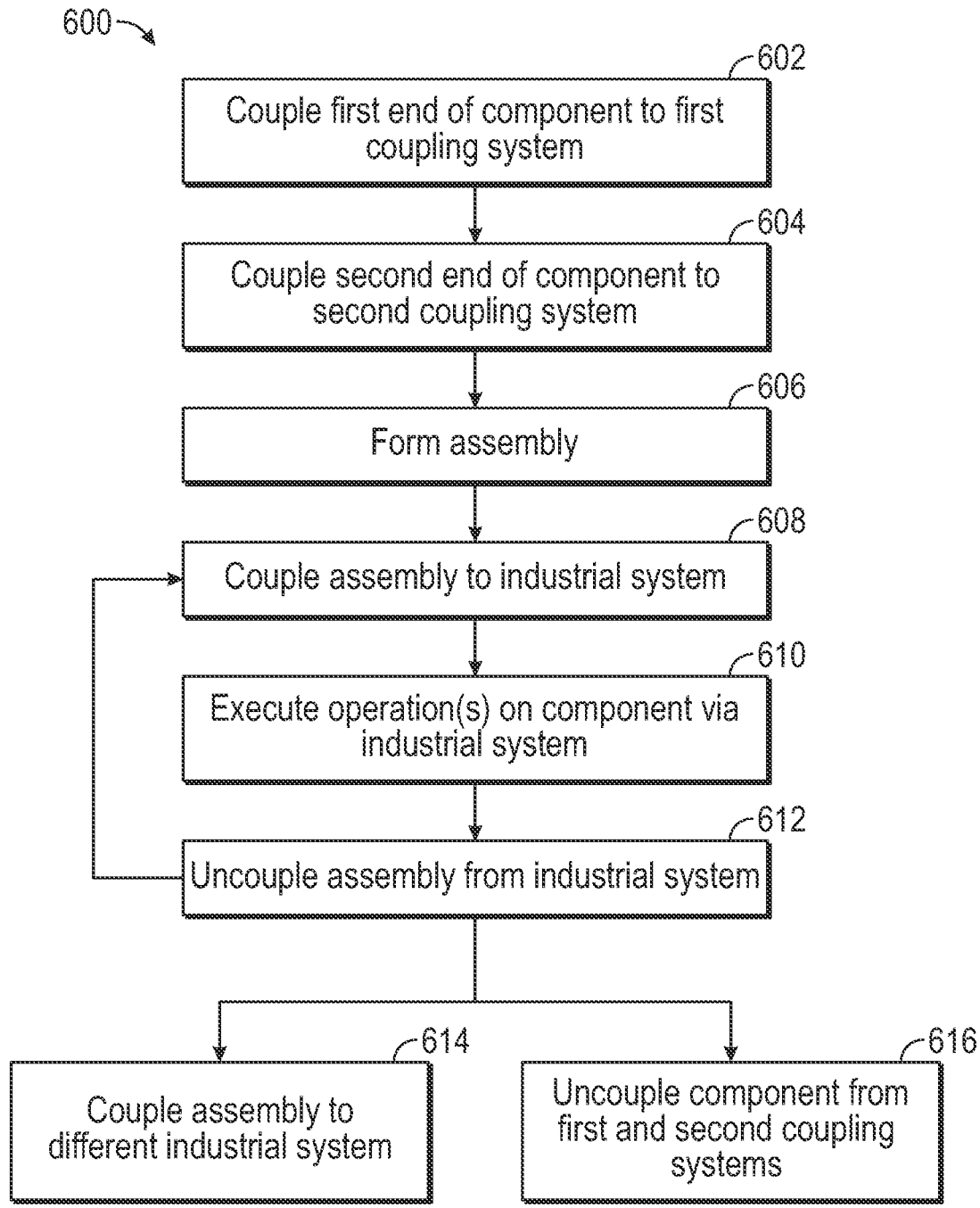
FIG. 6 depicts a flow chart of another method of using coupling systems according to aspects of the present disclosure.

FIG. 6 depicts a flow chart of a method 600 of using coupling systems according to embodiments of the present disclosure. At operation 602 of the method 600 (602—Couple first end of component to first coupling system), a first end of a first component is removably coupled to a first coupling system. At operation 604 (604—Couple second end of component to second coupling system), a second end of the first component is removably coupled to a second coupling system. Each of the first coupling system and the second coupling system can include one or more of the elements discussed above (e.g., a coupling mechanism, an attachment fixture, and/or a rotational element) as discussed above. In one example, operations 602 and 604 can occur simultaneously. For example, a fixture can be employed to pick and place the first component into both of the first and the second coupling systems simultaneously. In one example, the first coupling system and the second coupling system can include the same elements. In another example, each of the first coupling system and the second coupling system can include different elements.

Operations 602 and 604 are executed to form an assembly at operation 606 (606—Form assembly), of the first component and the first and second coupling mechanisms. At operation 608, the assembly is coupled to an industrial system. In one example at operation 608 (608—Couple assembly to industrial system), coupling the assembly to the industrial system forms a seal such that a pressure, temperature, or chemical environment is able to be formed and maintained during use of the industrial system. At operation 610 (610—Execute operation(s) on component via industrial system), one or more processes is executed via the industrial system. The operations executed at operation 610 can be in the form of programs stored as a plurality of logic such as a cleaning program, a manufacturing program (e.g., marking, coating, etc.) or an inspection program. The first and second coupling systems are configured to withstand vacuum pressures from about $1\times10^{-3}$ Pa to about $1\times10^5$ Pa as well as temperatures from about $-75°$ F. to about $322°$ F., and chemical environments of varying pH.

In one example of the method 600, which can be combined with other examples herein, at operation 612 (612—Uncouple assembly from industrial system), subsequent to operation 610, the assembly is uncoupled from the industrial system. At operation 614 (614—Couple assembly to different industrial system), the assembly can be re-coupled to a different industrial system and one or more processes can be executed on the first component.

In another example of the method 600, which can be combined with other examples herein, at operation 612, subsequent to operation 610, the assembly is uncoupled from the industrial system. Subsequently, at operation 616 (616—Uncouple component from first and second coupling systems), the first coupling system and the second coupling system can be uncoupled from the first component. In some examples, the first coupling system and the second coupling system can then be reassembled to a second, different component. In other examples, the first coupling system and the second coupling system can then be reassembled to different portions of the same, first component, and the methods 600 can be repeated. In still other examples, the first coupling system and the second coupling system can be uncoupled from the first component and subsequently cleaned and/or inspected prior to subsequent use.

Accordingly, the coupling systems discussed herein are configured to retain components to be cleaned in industrial equipment while performing one or more processes. The industrial equipment can perform processes that can include one or more of large temperature differentials, large pressure differentials, harsh (corrosive) chemicals, or other aspects and the coupling systems enable the processes to be executed without damaging the component or the coupling systems. The coupling systems used to couple the component to the cleaning equipment form a seal with one or more elements of the cleaning equipment, enabling the temperature and/or pressure differential to be created and maintained allowing for superior cleaning. The coupling systems are quick-connect and quick-release mechanisms, enabling the component to be cleaned, removably coupled to the coupling system using one hand or a single tool. In some examples, the component can be assembled to two or more coupling systems simultaneously, further improving the efficiency of the use of the coupling systems. Further, the coupling systems form seals with the industrial systems, including cleaning systems, such that the industrial systems can operate efficiently, that is, the industrial systems can execute various processes without loss of pressure, temperature, or cleaning media.

In the current disclosure, reference is made to various aspects. However, it should be understood that the present disclosure is not limited to specific described aspects. Instead, any combination of the above features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A coupling system, that comprises:
    a housing that comprises:
        a first end;
        a second end opposite the first end; and
        an inside surface that defines a housing cavity, wherein the first end comprises a first recess and the second end comprises a second recess;
    a first coupling mechanism positioned in the first recess, wherein the first coupling mechanism comprises:
        a first connector body in contact with the first recess, wherein the first connector body comprises:
            a first cavity;
            a first open end;
            a second open end;
            a first inside wall, wherein the first cavity extends from the first open end to the second open end and configured to receive a first end of a component; and
            a first aperture;
        a first flexible pad disposed concentrically in the first cavity and separated from an inside surface of the first connector body by a first gap, the first gap formed concentrically in and including the inside surface of the first connector body; and
        a first flexible sleeve disposed concentrically in the first cavity adjacent to the first flexible pad;
    a second coupling mechanism positioned in the second recess, wherein the second coupling mechanism comprises:
        a second connector body in contact with the second recess, wherein the second connector body comprises:
            a second cavity;
            a second flexible pad disposed concentrically in the second cavity; and
            a second flexible sleeve disposed concentrically in the second cavity adjacent to the second flexible pad
        a first open end;
            a second open end;
            a second inside surface, wherein the second cavity extends from the first open end to the second open end and is configured to receive a second end of a component; and
            a second aperture; and
        the second flexible pad separated from an inside surface of the second connector body by a second gap, the second gap formed concentrically in and including the inside surface of the second connector body.

2. The coupling system of claim 1, further comprising the coupling system removably coupled to an aperture configured as an inlet configured to define a fluid path through a chamber.

3. The coupling system of claim 2, wherein the first coupling mechanism is configured to accept a component and is positioned in the aperture.

4. The coupling system of claim 2, further comprising:
a component positioned in the chamber.

5. The coupling system of claim 4, wherein the coupling system is configured to clean the component positioned within-said chamber.

6. The coupling system of claim 1, wherein the coupling mechanism is configured to accept:
a component,
an attachment fixture removably coupled to the first coupling mechanism, and
a rotational element removably coupled to the attachment fixture.

7. The coupling system of claim 1, further comprising: a chamber alignment mechanism.

8. A coupling system, that comprises:
a housing that comprises:
a first end;
a second end opposite the first end; and
an inside surface that defines a housing cavity, wherein the first end comprises a first recess and the second end comprises a second recess;
a first coupling mechanism positioned in the first recess, wherein the first coupling mechanism comprises:
a first connector body in contact with the first recess, wherein the first connector body comprises:
a first cavity;
a first open end;
a second open end;
a first inside wall, wherein the first cavity extends from the first open end to the second open end and configured to receive a first end of a component; and
a first aperture;
a first flexible pad disposed concentrically in the first cavity and separated from an inside surface of the first connector body by a first gap, the first gap formed concentrically in and including the inside surface of the first connector body; and
a first flexible sleeve disposed concentrically in the first cavity adjacent to the first flexible pad;
coupling mechanism positioned in the second recess, wherein the second coupling mechanism comprises:
a second connector body in contact with the second recess, wherein the second connector body comprises a second cavity;
a second flexible pad disposed concentrically in the second cavity; and
a second flexible sleeve disposed concentrically in the second cavity adjacent to the second flexible pad.

9. The coupling system of claim 8, further comprising:
the first flexible pad being-configured to contact and apply pressure to the first flexible sleeve.

10. The coupling system of claim 9, further comprising the first aperture being configured to couple to a first pneumatic system, wherein the first pneumatic system is configured to dispose a first pneumatic media in the first gap to cause the first flexible pad to expand against the first flexible sleeve and cause the first flexible sleeve to apply pressure to the first end of the component to secure the first end of the component in the first coupling mechanism.

11. The coupling system of claim 8, further comprising:
the second connector body that comprises:
a first open end;
a second open end;
a second inside surface, wherein the second cavity extends from the first open end to the second open end and is configured to receive a second end of a component; and
a second aperture; and
the second flexible pad separated from an inside surface of the second connector body by a second gap, the second gap formed concentrically in and including the inside surface of the second connector body.

12. The coupling system of claim 11, further comprising the second aperture being configured to couple to a second pneumatic system wherein the second pneumatic system is configured to dispose a second pneumatic media in the second gap to cause the second flexible pad to expand against the second flexible sleeve and to cause the second flexible sleeve to apply pressure to the second end of the component to secure the second end of the component in the second coupling mechanism.

13. The coupling system of claim 8, further comprising:
a first gasket being positioned in the first recess of the housing, the first connector body being in contact with the first gasket; and
a second gasket being positioned in the second recess of the housing, the second connector body being in contact with the second gasket.

14. The coupling system of claim 8, further including a first system connection mechanism and a second system connection mechanism, wherein the first system connection mechanism is coupled to the first end of the housing and the second system connection mechanism is coupled to the second end of the housing, wherein each of the first system connection mechanism and the second system connection mechanism is configured to be removably coupled to a different portion of the coupling system.

15. The coupling system of claim 8, wherein the housing is formed from a metal selected from the group consisting of steel, aluminum, nickel, copper, brass, titanium and combinations thereof, and wherein each of the first connector body and the second connector body is formed from a metal selected from the group consisting of steel, aluminum, nickel, copper, titanium, brass and combinations and alloys thereof.

16. The coupling system of claim 8, wherein each of the first flexible pad and the second flexible pad are formed from a flexible material selected from the group consisting of polymers, elastomers, and combinations thereof, and wherein each of the first flexible sleeve and the second flexible sleeve are formed from a flexible material selected from the group consisting of polymers, elastomers, and combinations thereof.

17. The coupling system of claim 8, further comprising a plurality of pressure sensors communicatively coupled to each of a first pneumatic system and a second pneumatic system.

18. The coupling system of claim 8, further comprising a plurality of logic stored on a non-transitory computer-readable medium, and configured to determine a range of pressure to apply via each of a first pneumatic system and a second pneumatic system.

19. The coupling system of claim 8, further comprising:
a first pneumatic system including a first pneumatic pump, a first pneumatic media supply, a first valve, and a first tube, the first tube being configured to removably couple to a first gap of the first coupling mechanism to supply the first pneumatic media to the first gap; and a second pneumatic system including a second pneumatic pump, a second pneumatic media supply, a second valve, and a second tube, the second tube being configured to removably couple to a second gap of the second coupling mechanism to supply the second pneumatic media to the second gap.

20. The coupling system of claim 8, wherein a maximum outside diameter of a component is from about 0.25 inches to about 4.0 inches.

21. A method of using coupling systems, the method comprising:

removably coupling a first coupling system to a first aperture of a first plate at a top of a chamber of an industrial system, the first coupling system comprising:
   a housing that comprises:
      a first end;
      a second end opposite the first end; and
      an inside surface that defines a housing cavity, wherein the first end comprises a first recess and the second end comprises a second recess;
   a first coupling mechanism positioned in the first recess, wherein the first coupling mechanism comprises:
      a first connector body in contact with the first recess, wherein the first connector body comprises:
         a first cavity;
         a first open end;
         a second open end;
         a first inside wall, wherein the first cavity extends from the first open end to the second open end and configured to receive a first end of a component; and
         a first aperture;
      a first flexible pad disposed concentrically in the first cavity and separated from an inside surface of the first connector body by a first gap, the first gap formed concentrically in and including the inside surface of the first connector body; and
      a first flexible sleeve disposed concentrically in the first cavity adjacent to the first flexible pad;
   a second coupling mechanism positioned in the second recess, wherein the second coupling mechanism comprises:
      a second connector body in contact with the second recess, wherein the second connector body comprises a second cavity;
      a second flexible pad disposed concentrically in the second cavity; and
      a second flexible sleeve disposed concentrically in the second cavity adjacent to the second flexible pad;

removably coupling a second coupling system to a second aperture of a second plate at a bottom of the first chamber;

inserting a first end of a component in an opening of the first coupling system;

applying, via a first pneumatic system, a first pressure to secure the first end of the component to the first coupling system;

executing a plurality of logic stored on a computer-readable medium while the component is secured to the first coupling system and the second coupling system;

subsequent to executing the plurality of logic, deactivating the first pneumatic system to remove pressure from the first end of the component to decouple the first end from the first coupling system; and removing the component from the industrial system.

22. The method of claim 21, wherein the industrial system further comprises:
   a second chamber coupled to the first aperture of the first plate, wherein the first plate is a first divider between the first chamber and the second chamber; and
   a third chamber coupled to the second aperture of the second plate, wherein the second plate is a second divider between the first chamber and the third chamber, the first aperture and the second aperture defining a fluid path through the first chamber.

23. The method of claim 21, further comprising:
   prior to executing the plurality of logic, inserting a second end of the component in an opening of the second coupling system;
   applying, via a second pneumatic system, a second pressure to secure the second end of the component to the second coupling system; and
   subsequent to executing the plurality of logic, deactivating the second pneumatic system to remove pressure from the second end of the component to decouple the second end from the second coupling system.

24. The method of claim 23, wherein the first pressure is from about 1 kilopascal (KPa) to about 200 KPa and the second pressure is from about 1 KPa to about 200 KPa.

* * * * *

UNITED STATES PATENT AND TRADEMARK OFFICE
CERTIFICATE OF CORRECTION

| | | |
|---|---|---|
| PATENT NO. | : 12,285,808 B2 | Page 1 of 1 |
| APPLICATION NO. | : 17/378292 | |
| DATED | : April 29, 2025 | |
| INVENTOR(S) | : Om Prakash et al. | |

It is certified that error appears in the above-identified patent and that said Letters Patent is hereby corrected as shown below:

In the Claims

Column 27, Line 46, Claim 8, correct "coupling mechanism" to read -- a second coupling mechanism --

Signed and Sealed this
Third Day of June, 2025

Coke Morgan Stewart
*Acting Director of the United States Patent and Trademark Office*